(12) United States Patent  
Cremer et al.

(10) Patent No.: US 8,155,409 B2
(45) Date of Patent: Apr. 10, 2012

(54) WAVE FIELD MICROSCOPE WITH SUB-WAVELENGTH RESOLUTION AND METHODS FOR PROCESSING MICROSCOPIC IMAGES TO DETECT OBJECTS WITH SUB-WAVELENGTH DIMENSIONS

(75) Inventors: Christoph Cremer, Heidelberg (DE); David Baddeley, Heidelberg (DE); Jurgen Reymann, Heidelberg (DE); Udo Birk, Furtwangen (DE)

(73) Assignee: Ruprecht-Karls-Universitat, Heidelberg (DE)

( * ) Notice: Subject to any disclaimer, the term of this patent is extended or adjusted under 35 U.S.C. 154(b) by 969 days.

(21) Appl. No.: 12/148,230

(22) Filed: Apr. 17, 2008

(65) Prior Publication Data

US 2009/0263002 A1 Oct. 22, 2009

(51) Int. Cl.
*G06K 9/00* (2006.01)
(52) U.S. Cl. ........................................ 382/128
(58) Field of Classification Search .......... 382/128
See application file for complete search history.

(56) References Cited

U.S. PATENT DOCUMENTS

| | | | |
|---|---|---|---|
| 5,838,815 A | 11/1998 | Gur et al. | |
| 5,856,665 A | 1/1999 | Price et al. | |
| 7,738,695 B2 * | 6/2010 | Shorte et al. | 382/154 |
| 2004/0101912 A1 | 5/2004 | Rubin et al. | |
| 2005/0136006 A1 | 6/2005 | Libutti et al. | |
| 2006/0285122 A1 | 12/2006 | Bankhead et al. | |
| 2007/0011628 A1 | 1/2007 | Ouali et al. | |
| 2007/0042978 A1 * | 2/2007 | Girard et al. | 514/44 |

OTHER PUBLICATIONS

Pham et al., Current Methods in Medical Image Segmentation, Annual Rev. Biomed. Eng, 2000, 02:315-337.*

* cited by examiner

*Primary Examiner* — Christopher Mahoney
(74) *Attorney, Agent, or Firm* — Gerald E. Hespos; Michael J. Porco

(57) ABSTRACT

The invention relates to a computer implemented method for processing of microscopic images to detect objects of interest. The method includes subjecting the microscopic image to a bandpass filtering to obtain a filtered image, wherein the bandpass filtering is such as to suppress the noise and any objects which are larger than a predetermined size; and processing the filtered image at a plurality of progressively decreasing threshold levels. The processing at each threshold level includes detecting the objects of interest using an object labelling algorithm and removing the detected objects detected at a given threshold level from the working image before proceeding to the next threshold level.

21 Claims, 22 Drawing Sheets

WAVE FIELD MICROSCOPE WITH SUB-WAVELENGTH RESOLUTION AND METHODS FOR PROCESSING MICROSCOPIC IMAGES TO DETECT OBJECTS WITH SUB-WAVELENGTH DIMENSIONS

BACKGROUND OF THE INVENTION

Spatially Modulated Illumination (SMI) microscopy is a method of wide field fluorescence microscopy featuring structured, respectively interferometric illumination, which delivers structural information about nanoscale architecture in fluorescently labelled cells. The structural information may be for example information about sizes of and distances between fluorescently marked target regions. To generate the illumination pattern two counter propagating laser beams are brought to interference, establishing a standing wave field. For the analysis of three-dimensional (3D) nanostructures SMI microscopy applies methods of point spread function (PSF) engineering, enabling the quantitative characterisation of the sizes of fluorescent objects in a range of about 30-200 nm in axial direction. Using structured wide field illumination in combination with wide field detection, this technique provides additional information about the analysed objects than conventional microscopy techniques like Confocal Laser Scanning Microscopy (CLSM).

In combination with a high precision axial positioning this technique of far-field light microscopy allows the non-destructive analysis of complex spatial arrangements inside thick transparent specimens like the cell nucleus and enables size measurements in molecular dimensions of some ten nanometers. SMI microscopy is for example an established method for the analysis of topological arrangements of the human genome. In combination with novel approaches for fluorescence labelling, the SMI "nanosizing" technique has proved its applicability for a wide range of biological questions when using fixed cell preparations.

Confocal laser scanning microscopy (CLSM or LSCM) is a technique for obtaining high-resolution optical images. In particular, it is capable of procusing in-focus images of thick samples via a process known as optical sectioning. Images are acquired point-by-point and reconstructed with a computer, allowing three-dimensional reconstructions of topologically-complex objects.

In a confocal laser scanning microscope, a laser beam passes through a light source aperture and then is focused by an objective lens into a small (ideally diffraction limited) focal volume within a fluorescently labeled sample. A mixture of emitted fluorescent light and reflected laser light from the illuminated spot is collected by the objective lens. A beamsplitter separates the emitted fluorescent light from the excitation light allowing only the fluorescent light into the detection apparatus. After passing a pinhole, which suppresses the out-of-focus light, the fluorescent light is detected by a photodetection device (for example a photomultiplier tube (PMT) or an avalanche photodiode), transforming the light signal into an electrical one that is recorded by a computer.

As a laser scans over the plane of interest, a whole image is obtained pixel-by-pixel and line-by-line, where the brightness of a resulting image pixel corresponds to the relative intensity of detected fluorescent light. After obtaining images of various z-axis planes (also known as z stacks) of the sample, a computer can generate a three-dimensional picture of a specimen by assembling a stack of these two-dimensional images from successive focal planes.

4Pi microscopy is a form of far-field confocal fluorescence microscopy which uses interference of the excitation and/or detection light to result in an increase in the effective acceptance angle and hence numeric aperture of the system. The 4Pi-Microscope uses two high resolution objective lenses to illuminate the sample (specimen) from both, the back and the front side. Using a single lens, even of the largest numerical aperture possible, only a segment of a spherical wavefront can be "imaged". As a result, the focal spot is longer (z-direction, axial) than wide (x,y-direction, lateral). Object structures which are smaller than half the wavelength (250 nanometers for green light) can no longer be resolved, because of the blurred image.

Due to the two objective-lenses of the 4Pi microscope, this problem is partially solved. Both focal light spots are coherently superimposed, and their interference produces additional axial structure in the focal spot. After postprocessing, an image can be obtained with an effective optical resolution, which is approximately 3 to 5 times sharper in the axial direction than the spot of a conventional Confocal Laser-Scanning Microscope.

With the above microscopic methods and in particular the SMI method the samples analysed are mainly fixed specimens. However, the influence of fixation procedures on the overall cell structure and in particular on the nanostructure of the genome is not yet clarified. For instance it is still not known exactly how different fixation methods influence the overall cell structure and biochemistry. For many biological questions it is of utmost interest to image the pure, non-influenced genome topology as well as to obtain information about the dynamical behaviour of subnuclear complexes and physiological processes.

Thus it is an object of the present invention to improve the methods for high precision measurement and structural analysis below the conventional optical resolution limit (i.e. with sub-resolution accuracy). It is another object to develop a microscopic system capable of high precision in-vivo measurements.

SUMMARY OF THE INVENTION

According to an aspect of the invention there is provided a computer implemented method for processing of microscopic images to detect objects of interest, in particular objects with size smaller that the conventional optical resolution limit of the microscopic system with which the microscopic images are obtained, comprising:
  subjecting the microscopic image to a bandpass filtering to obtain a filtered image, wherein the bandpass filtering is such as to suppress the noise and any objects which are larger than a predetermined size; and
  processing the filtered image at a plurality of progressively decreasing threshold levels, said processing comprising:
    at each threshold level detecting the objects of interest using an object labelling algorithm; and
    removing the detected objects detected at a given threshold level from the working image before proceeding to the next threshold level.

The step of removing the objects detected at each threshold level may comprise:
  obtaining an estimate of the form the detected images would have taken in the image by applying a weighting to the masked image and convolving it with an approximation of the point spread function of the microscope;
  subtracting the estimate from the working image.

The upper threshold level of the threshold range over which the processing of the filtered image is applied may be set at a half the maximum intensity in the filtered image. The lower threshold level of the threshold range over which the processing of the filtered image is applied may be estimated by multiplying the intensity corresponding to the maximum of the intensity histogram of the filtered image with a user defined factor.

The remaining threshold levels may be distributed logarithmically between the upper and lower threshold level.

The threshold level at which the object is detected along with the position of the detected object may be recorded and the threshold level adjusted a-posteriori by discarding all those points detected at and below a threshold value, at which a predetermined proportion of objects are not being analysed with a predetermined measure of goodness.

The microscopic images may be images obtained with a spatially modulated illumination microscopy or by a confocal laser scanning microscopy.

According to another aspect of the invention there is provided a computer implemented method for processing a stack comprising a plurality of two dimensional microscopic images of a fluorescently marked sample obtained by illuminating the sample with a structured illumination light and detecting the fluorescent light emitted from the sample, wherein each of said two dimensional microscopic images is an image of a plane, which is perpendicular to a predetermined axial direction, each of said two dimensional microscopic images being an image of a different plane along the axial direction. The method comprises:

for a given object in the stack of microscopic images, determining the axial intensity distribution of the fluorescent light along the axial direction; and fitting a mathematical model function I(z) of the form:

$$I(z) = A \times \text{Env}(z) \times F(z)$$

to the obtained axial intensity distribution, wherein:

z is the predetermined axial direction;

A is a scaling factor;

Env(z) is an empirical envelope of the intensity distribution obtained by subjecting the intensity distribution to a low pass filtering, such as to remove the additional frequencies introduced through the structured illumination pattern; and F(z) is a function fitted to the component of the intensity distribution in the axial direction due to the structured illumination light.

The method is particularly suitable to process microscopic images to detect objects with size smaller that the optical resolution limit of the microscopic system with which the microscopic images are obtained.

The stack of microscopic images may be obtained by means of a Spatially Modulated Illumination microscopy. The model function I(z) may be of the form:

$$I(z) = A \times \text{Env}(z)(1 - r + r \cos^2(k(z - z_0) + \phi)),$$

wherein:

A is a scaling factor;

$k = 2n\pi/\lambda_{exc}$ is the wave number, wherein n is the refractive index of the medium and $\lambda_{exc}$ is the wavelength of the excitation light;

$z_0$ is a displacement of the observed modulation pattern with respect to the origin;

$\phi$ is a phase offset, and r is the modulation depth defined as $$r = \frac{I_{max} - I_{min}}{I_{max}}, I_{max}$$

being the intensity maxima of the outer envelope of the axial intensity distribution and $I_{min}$ being the intensity maxima of the inner envelope of the axial intensity distribution.

The method may further comprise the step of determining the size of the object in the axial direction, by relating the modulation depth r to the object size in the axial direction with a theoretical calibration curve.

The model function may be fitted using a Lavenburg-Marquart solver, solving a weighted or non-weighted least squares problem.

The method may further comprise a step of estimating the start parameters for the fit, wherein said start parameters are extracted from the axial intensity distribution by finding the locations of the central maximum, the next fringe on one side, and the local minimum between the two.

Prior to the estimating of the start parameters an interpolation of the data points may be carried out.

The method may further comprise a step of controlling the quality of the fit, comprising comparing the fitted wavelength to the wavelength of the excitation light.

The object may be detected by the method for processing of microscopic images to detect objects of interest according to an aspect of the invention.

The quality of the fit of the mathematical fitting function may be used also as a measure of goodness of object detection. The adjusting the threshold a-posteriori may be performed by discarding all those points detected at and below a threshold value, at which a predetermined proportion of objects were not correctly fitted.

According to another aspect of the invention there is provided a computing system comprising:

a storage unit capable of storing a plurality of microscopic images;

a processing unit capable of carrying out the steps of the method for processing of microscopic images according to anyone of claims 1 to 15 to process the stored microscopic images.

Furthermore, according to still another aspect of the invention, there is provided a computer program product comprising an instruction set for performing the steps of the method for processing of microscopic images according to an aspect of the invention.

A further aspect of the invention concerns a microscopical system comprising:

an illumination system capable of providing an illumination light from a light source to at least partially illuminate a sample to be examined, the illumination system comprising at least one light source and a lens system;

a detection system comprising at least one light detector capable of detecting a microscopic image of the illuminated sample;

a sample holder;

a storage unit capable of storing the obtained microscopic image; and a computing unit comprising:

a storage unit capable of storing the detected microscopic images;

a processing unit capable of carrying out the steps of the method for processing of microscopic images according to an aspect of the invention to process the stored microscopic images.

The illumination system may be capable of providing a structured illumination light to at least partially illuminate the fluorescently marked sample. The detection system may be capable of detecting a stack comprising a plurality of two dimensional microscopic images of the sample, said microscopic images being obtained by illuminating the sample with the structured illumination light and detecting the fluorescent light emitted from the sample, wherein each of said two dimensional microscopic images is an image of a plane, which is perpendicular to a predetermined axial direction, and each of said two dimensional microscopic images is an image of a different plane along the axial direction.

The microscopical system may be a Spatially Modulated Light microscopical system, wherein the lens system comprises two oppositely arranged objective lenses;

the structured illuminated light is generated by two coherent counter propagating laser beams focused in the back focal planes of the two opposite objective lenses, thus establishing a standing wave field in the space between the two objective lenses; and the sample holder is capable of positioning the sample between the two objective lenses and moving the sample along a direction parallel to the predetermined axial direction, said predetermined axial direction being parallel to the optical axis of the two objective lenses.

The Spatially Modulated Light microscopical system may have a vertical arrangement, wherein the optical axis of the oppositely arranged objective lenses is parallel to a vertical direction.

The microscopical system may further comprise an incubation camber enclosing the sample holder, the illumination and the detection system with the exception of the light source and the light detector. The incubation chamber may be capable of maintaining a stable temperature.

The microscopical system may further comprise an observation chamber for holding a living sample, said observation chamber comprising an interface to a flow control system, which enables a supply of nutrients and $CO_2$ to the sample and removal of waste products from the sample.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
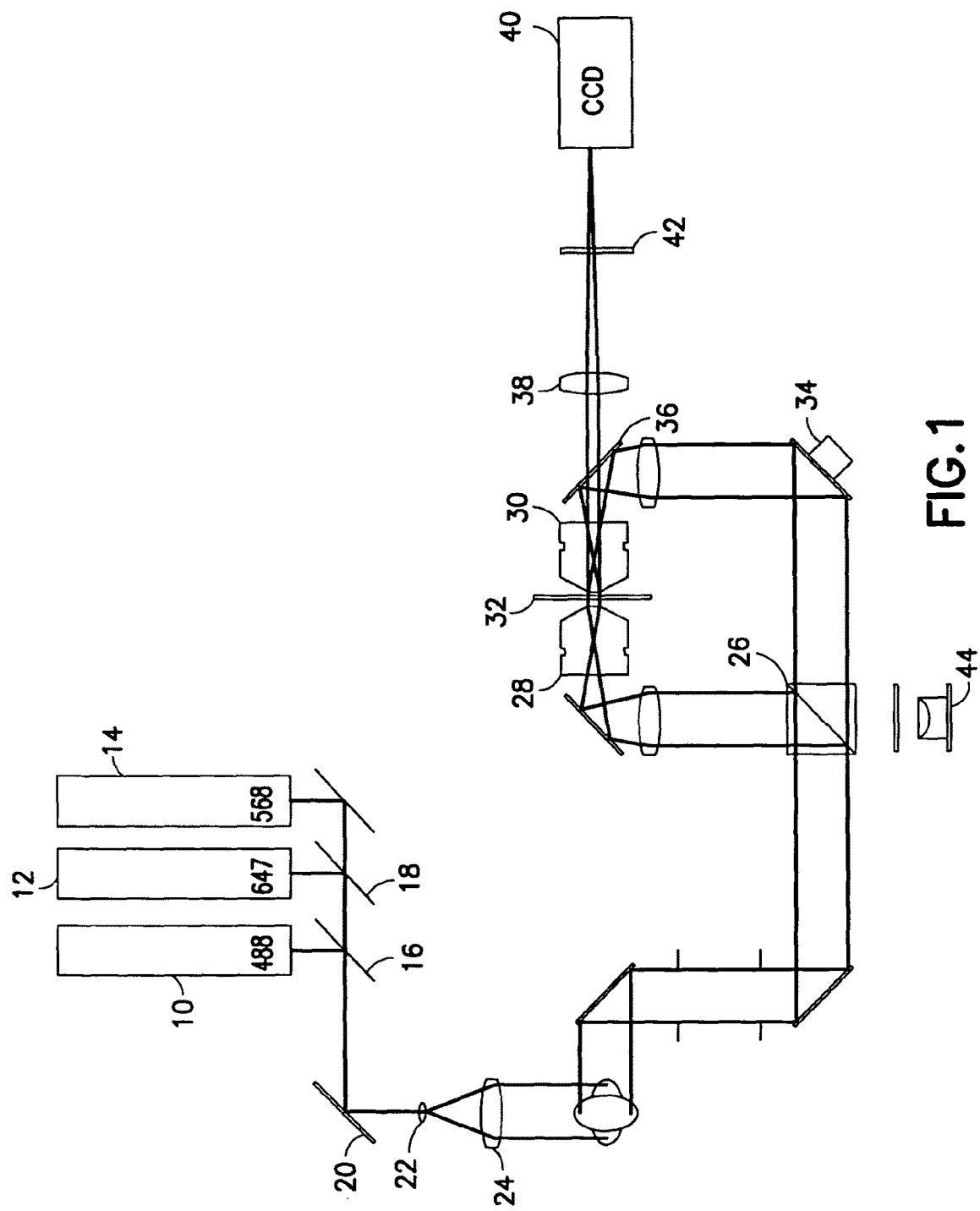
FIG. 1 shows a schematic optical layout of an example of a SMI microscope according to one embodiment of the invention

FIG. 1 shows schematically the optical layout of a SMI microscope (as an example of a microscopical system) with a horizontal arrangement according to one example of the invention.

SMI microscope uses structured widefield illumination by means of an interference pattern, in combination with a widefield detection.

The illumination system comprises two or optionally three lasers for 488 nm (laser source 10), 568 nm (laser source 12) and optionally 647 nm (laser source 14) excitation as light sources. For example Lexel 95-4, Lexel 95L-K and Lexel 95-K from Lexel Laser, USA may be used as laser sources. In one embodiment the laser sources may be additionally independently switched with shutters before being combined with the respective dichroic mirrors 16 and 18 (for example from AHF Analysentechnik AG, Tübingen, Germany). The dichroic mirror 20 works as a cleanup filter and reflects the three laser lines into the collimator, consisting of two achromats 22 and 24 (for example from Linos Photonics, Göttingen, Germany) with 10 mm and 100 mm focal length respectively, to expand the beam to a diameter of approximately 2 cm. In one embodiment the laser sources are operated in TEM00 mode. Thus a Gaussian profile of the laser beam may be obtained.

The expanded laser beam is then conveyed to the bread board via a periscope where it is split by a 50:50 beam splitter 26 (for example from Edmund Optics, Karlsruhe, Germany), yielding two coherent counter propagating and collimated laser beams which are focused into the back focal plane of two opposite oil immersion objective lenses 28 and 30 (100×, NA=1.4, Leica, Bensheim, Germany). This results in a collimated laser beam leaving each objective lens. Interference between these two beams leads to a standing wave field in the space between the two objective lenses, and hence a $cos^2$-shape of the intensity along the optical axis. In one embodiment an additional bread board made from super-invar on the optical table is used for the interferometrical unit in order to guarantee maximal thermal stability. Samples may be prepared using ordinary object slides. The slides 32 are then placed between the two objective lenses 28 and 30 and moved along the optical axis with a piezo electrical stage (not shown), thus allowing 3D data stacks of the specimens to be obtained. The piezo electrical stage may be for example a piezo electrical stage from Physik Instrumente, Karlsruhe, Germany. An additional piezo electrical stage 34 allows the relative phase in the two interferometer arms to be varied. The slides together with the prepared sample are held by a slide holder not shown in FIG. 1.

The emission light from the fluorescently labeled target regions, collected by the detection objective lens 30, is then separated from the excitation light by a dichroic mirror 36 (for example from AHF Analysentechnik AG, Tübingen, Germany) and focussed with the help of a tube lens 38 (for example 1.25×, Leica, Bensheim, Germany) onto a highly sensitive black-and-white CCD camera 40 (for example SensiCam QE, PCO Imaging, Kelheim, Germany) used for detection. In front of the CCD chip, a blocking filter 42 in a filter wheel, blocks any remaining laser light, and, depending on filter selection, out of band fluorescence. Moreover, a white Light Emitting Diode 44 can be used in transmission mode to locate the focal plane in order to reduce bleaching of the dyes.

In this arrangement, the optical axis of the SMI microscope defined by the optical axis of the two opposite objective lenses 28 and 30 coincides with the z-Axis of the system. The plane which is vertical to the optical axis is the x-y plane.

The sample may be fluorescently labelled using for example FISH (in particular FAST-FISH and COMBO-FISH) labelling techniques. Thus, the sample may comprise a plurality of fluorescently labelled objects to be analysed, i.e. objects of interest or short objects.

In the above arrangement the lens system of the illumination system comprises in particular the dichroic mirrors 16, 18 and 10, the achromatic lenses 22 and 24 the beam splitter 26, and the objective lens 28. The detection system comprises in particular the CCD camera 40 as a light detector and the tube lens 38. The objective lens 30 serves both the illumination of the sample and the collection of the detected light. Similarly, the dichroic mirror 36 serves both the guiding of the (upper) light beam to the objective lens 30 and the separation of the excitation from the emission (or detection) light. The illumination and detection system may comprise further optical elements.

Data Acquisition

Due to the collimated beam in the object space the complete lateral focal plane can be imaged simultaneously. For data acquisition (DAQ), the samples to be analysed only have to be scanned in one dimension (axial) which leads to more rapid DAQ-rates in contrast to confocal microscopy techniques.

In performing an object scan the sample may be moved along the optical axis through the focus of the objective (and simultaneously through the standing wave pattern) with an image acquired at each step with the CCD camera. This results in a 3D image stack from which both position and size information can be extracted. A step size of 20 nm between slices had previously been used, resulting in a considerable oversampling of the signal. It has, however, been realized that surprisingly better results are obtained with a larger step size and proportionally longer integration time. The axial step size is thus set for example to 40 nm. This means that the signal is still oversampled, given a Nyquist step size of around 70 nm for wave front distances (the wave front distance being depend on the wave length of the illuminating laser) of about 180 nm. The slight oversampling contributes to the stability of the subsequent data fitting.

In addition or as an alternative to the object scan, it is also possible to perform a phase scan in which the position of the sample to be analysed remains constant and the position of the standing wave is moved. This can in some cases have some disadvantages. For example samples or the objects to be analysed can be measured within one plane, and it is not possible to directly measure the period of the interference pattern, which depends on both the angle between the two beams and the sample's (or specimen's) refractive index. Furthermore, position information is only obtained modulo the standing wave period.

If, however, the sample comprises objects of interest, which are all in the one plane, a phase scan can be faster and require a lower photon-dose for the same detected intensity. Thus phase scan may be in particular applicable for in-vivo measurements. It is also possible to conceive a combined object and phase scan in which the object or the sample is moved in relatively large steps (i.e. ≈200-250 nm) and a phase scan made at each z position. The position information and ability to analyse 3D objects or samples would then be retrieved. Generally it is possible for a combined scan to consist of fewer individual images and yet have the same information content as a normal object scan.

If the samples be analysed comprise a plurality of mobile objects, it is also possible to leave the sample stationary in the focal plane of the detection objective lens instead of moving it and utilise the movement of the object in the structured illumination light to accurately resolve mobility patterns (for example mobility patterns of subchromosomal compartments) in at least one dimension. Due to the structured illumination accurate mobility profiles are accessible when the mobile object is moving through the illumination pattern.

Principle of SMI Measurements

The interference of the laser beams from each of the objectives produces a sinusoidal standing wave pattern along the optical (z) axis which has the form:

$$I(z) = I_0 \cos^2\left(\frac{2n\pi\cos(\alpha)z}{\lambda_{exc}} + \phi\right), \quad (1)$$

where $\lambda_{exc}$ is the excitation wavelength, n the refractive index in the sample, z the distance along the optical axis, $\phi$ an arbitrary phase offset and $\alpha$ the angle between the two laser beams which, for normal alignment, can be considered to be small. In further consideration, $\alpha$ may be assumed to be 0. Any errors due to non-zero $\alpha$ manifest themselves as a reduction in the apparent refractive index.

As the sample and respectively the object to be analysed is moved axially through the illumination pattern and the microscope focus, images are acquired at each step with the CCD camera, resulting in a three dimensional 3D image stack. Sampling of an extended, fluorescent object in axial direction (i.e. in z-direction) through the standing wave field results in a modulated SMI axial profile whose form depends on the size of the object.

The structured illumination leads to a modified SMI Point Spread Function (PSF). In the following a brief overview of the PSF in z-axial direction (i.e. in the direction of the optical axis) is considered since the SMI technique provides additional information in that dimension. The SMI PSF is the product of the detection PSF corresponding to an ordinary wide field PSF and the illumination PSF which is given by the $\cos^2$-shape. It is thus characterised by an additional modulation in the axial direction. The envelope of the wide field PSF can be calculated from the laser excitation wavelength, the refractive index in the object space and the numerical aperture of the detection objective lens.

Figure 2B:
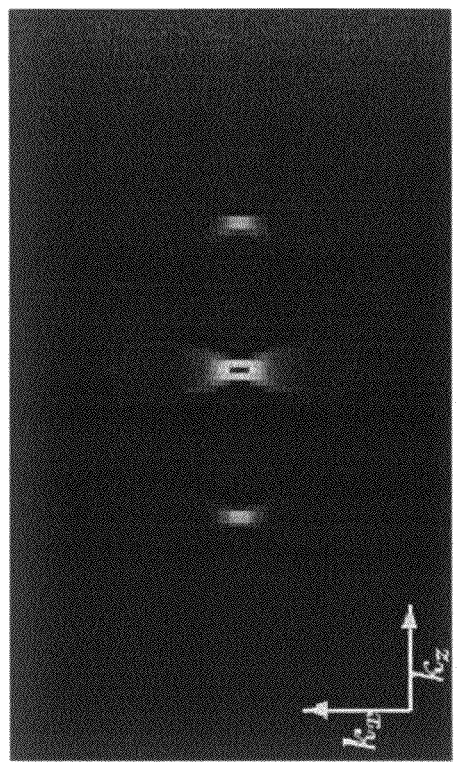
FIG. 2 shows a simulated SMI PSF (FIG. 2a) and OTF (FIG. 2b)
Figure 2A:
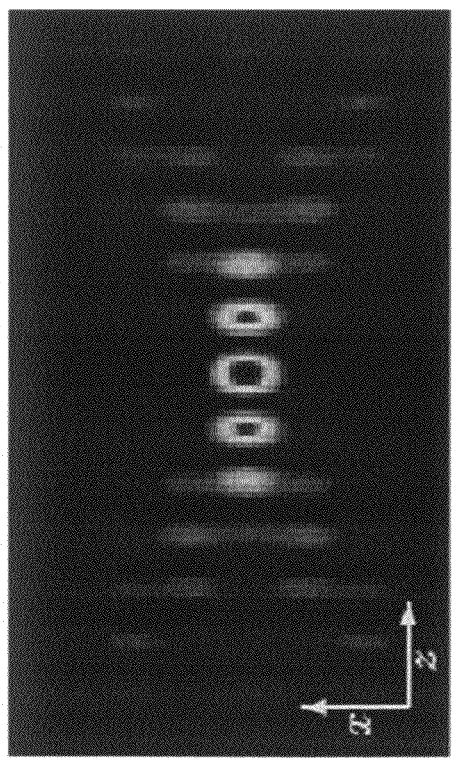

FIG. 2 shows a simulated SMI PSF (FIG. 2a) and the respective OTF (FIG. 2b).

In the frequency domain ($k_x$ and $k_z$) the illumination pattern consists of three delta functions at 0 and ± the frequency of the interference pattern. The Optical Transfer Function (OTF) is thus composed of three copies of the wide field OTF at the locations of the delta functions (FIG. 2b). The two additional copies at ±$k_z$ provide more information about the object.

Figure 3:
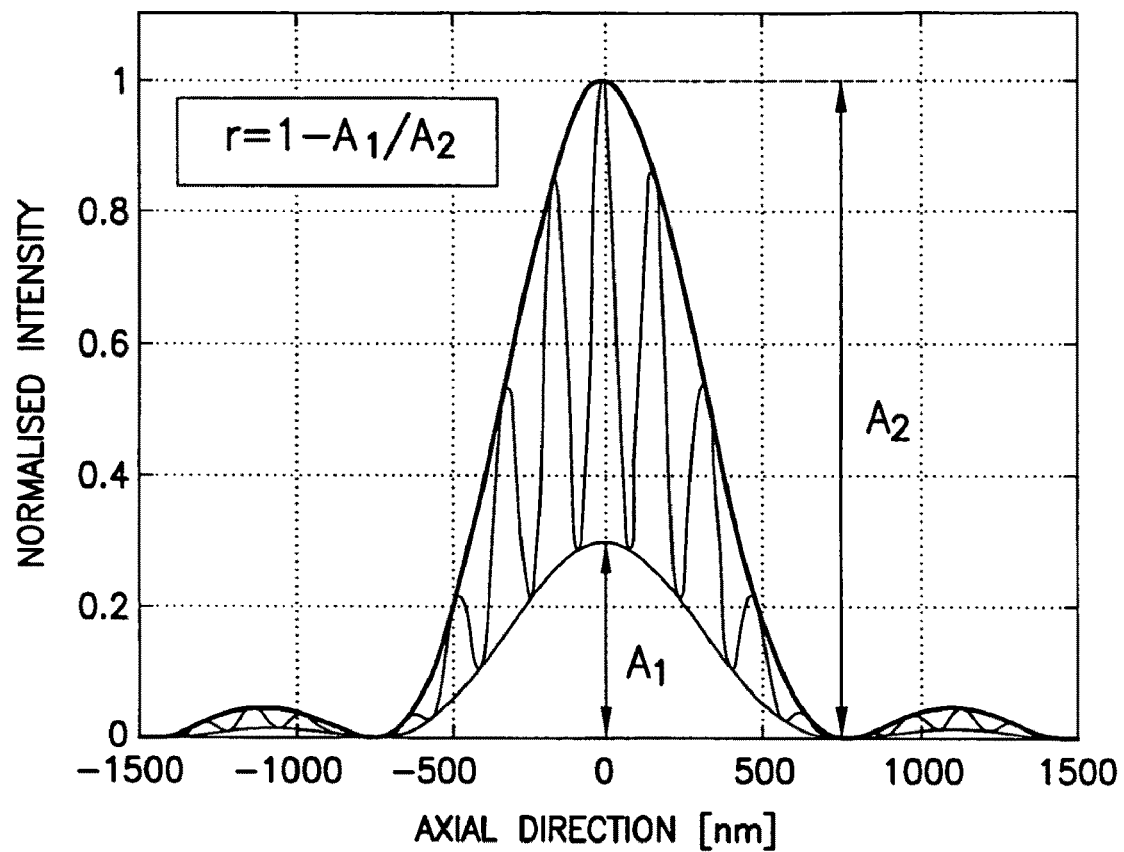
FIG. 3 shows a computer simulated Axial Intensity Distribution (AID) of a 100 nm microsphere.
Figure 4A:
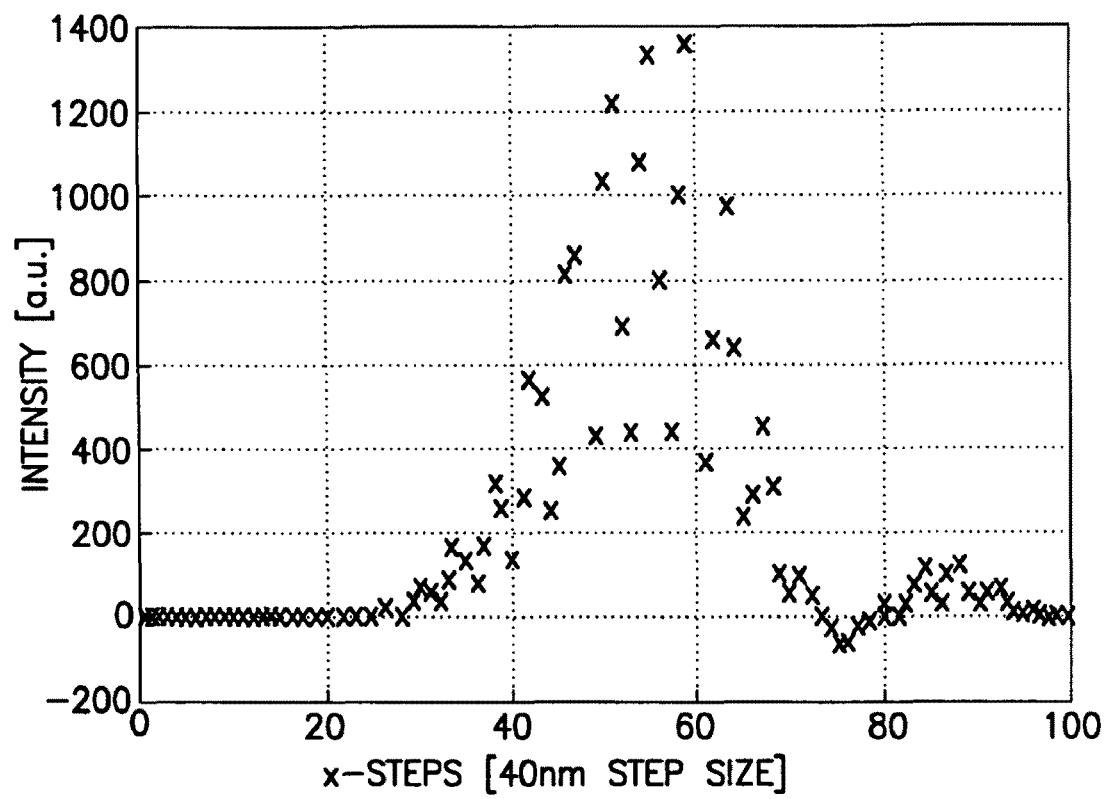
FIGS. 4a-e show schematically the fit process.
Figure 4B:
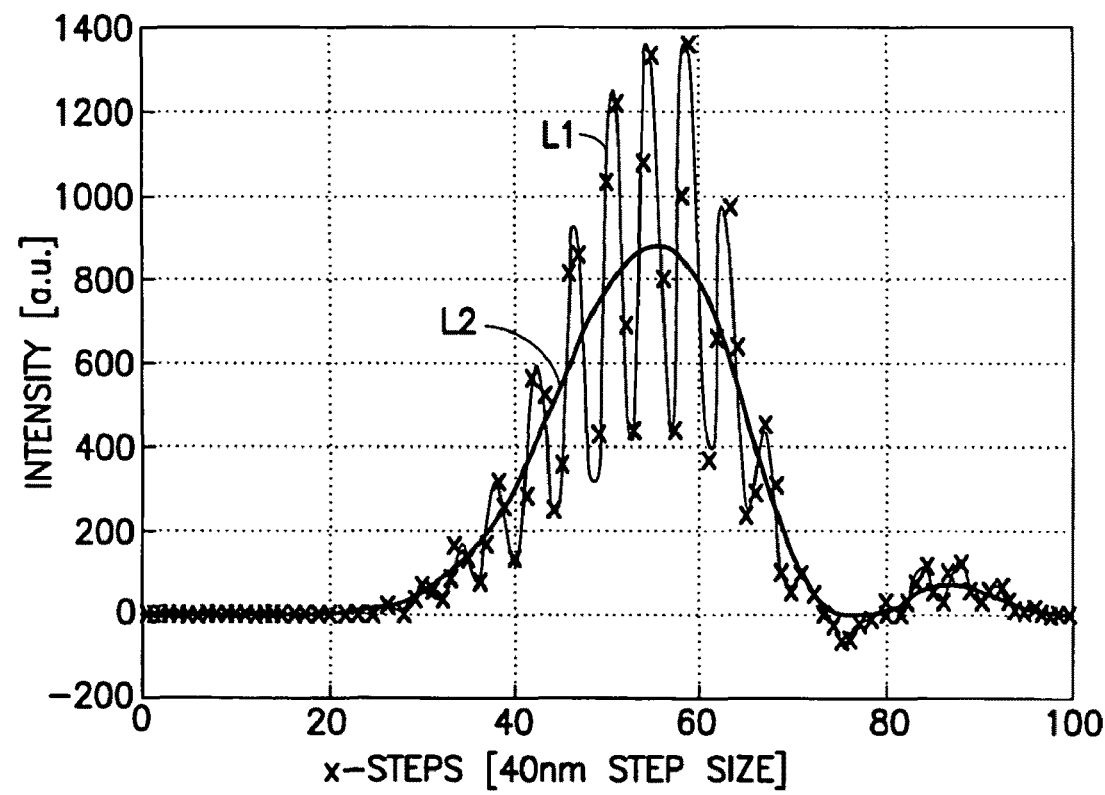
Figure 4C:
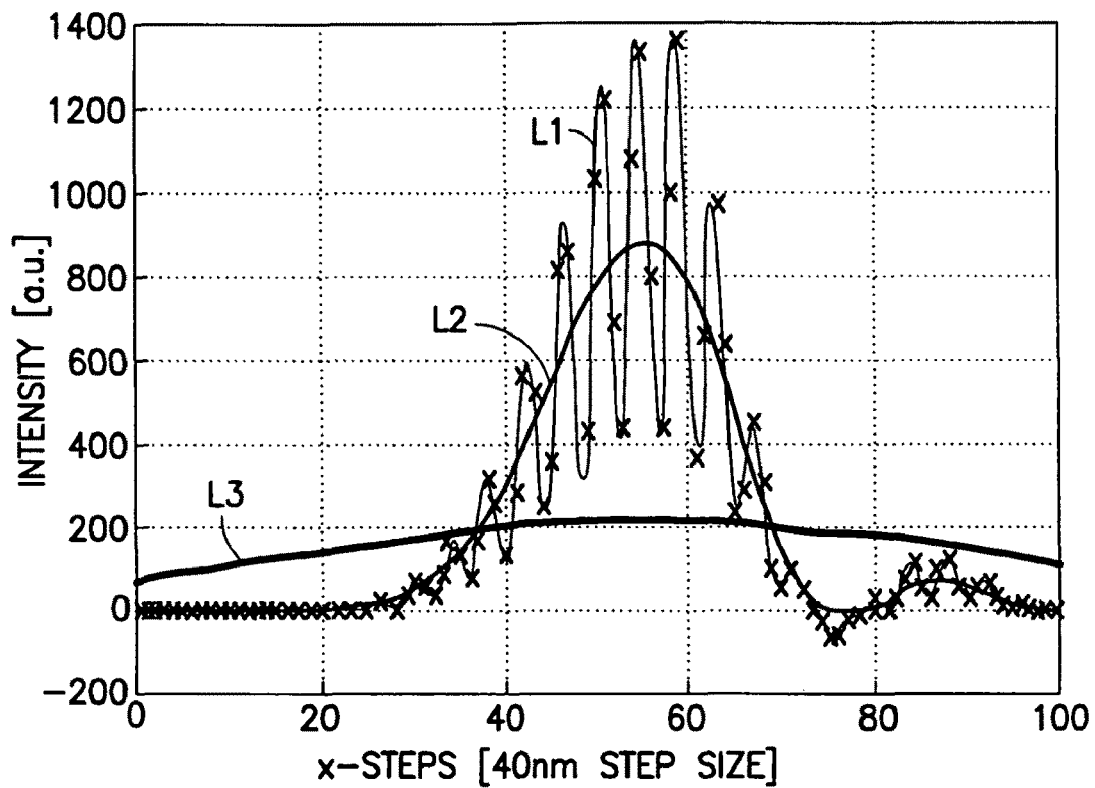
Figure 4D:
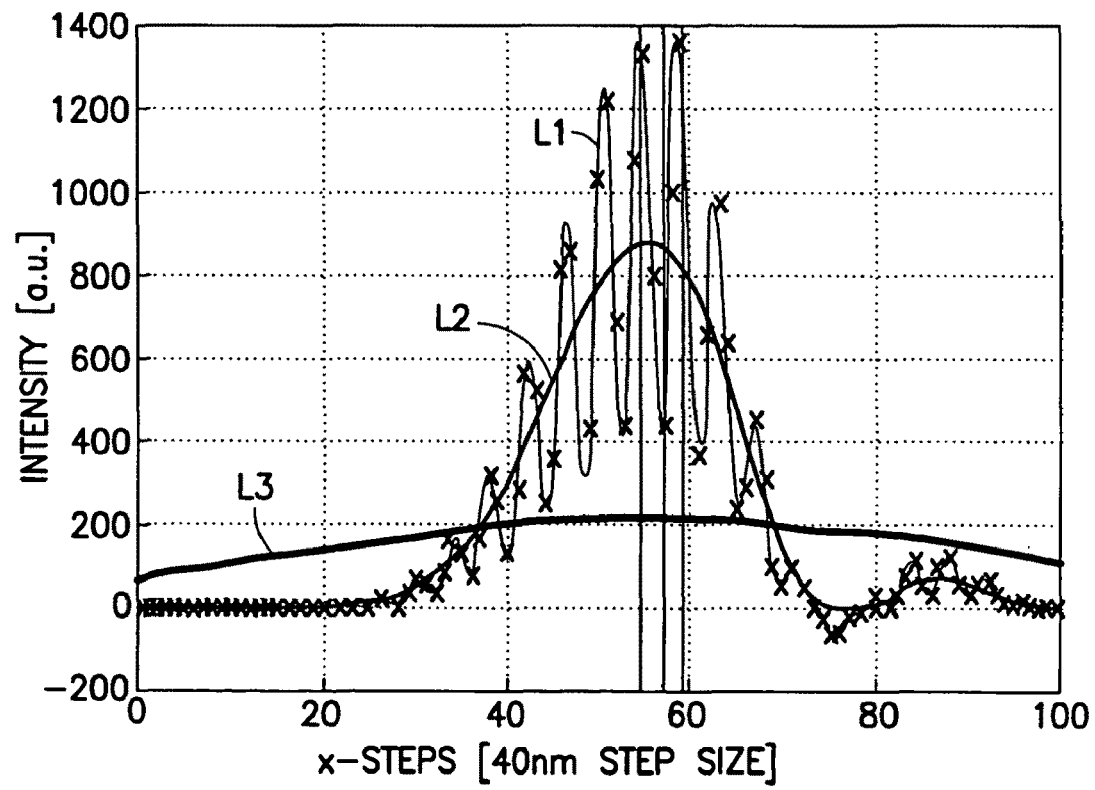
Figure 4E:
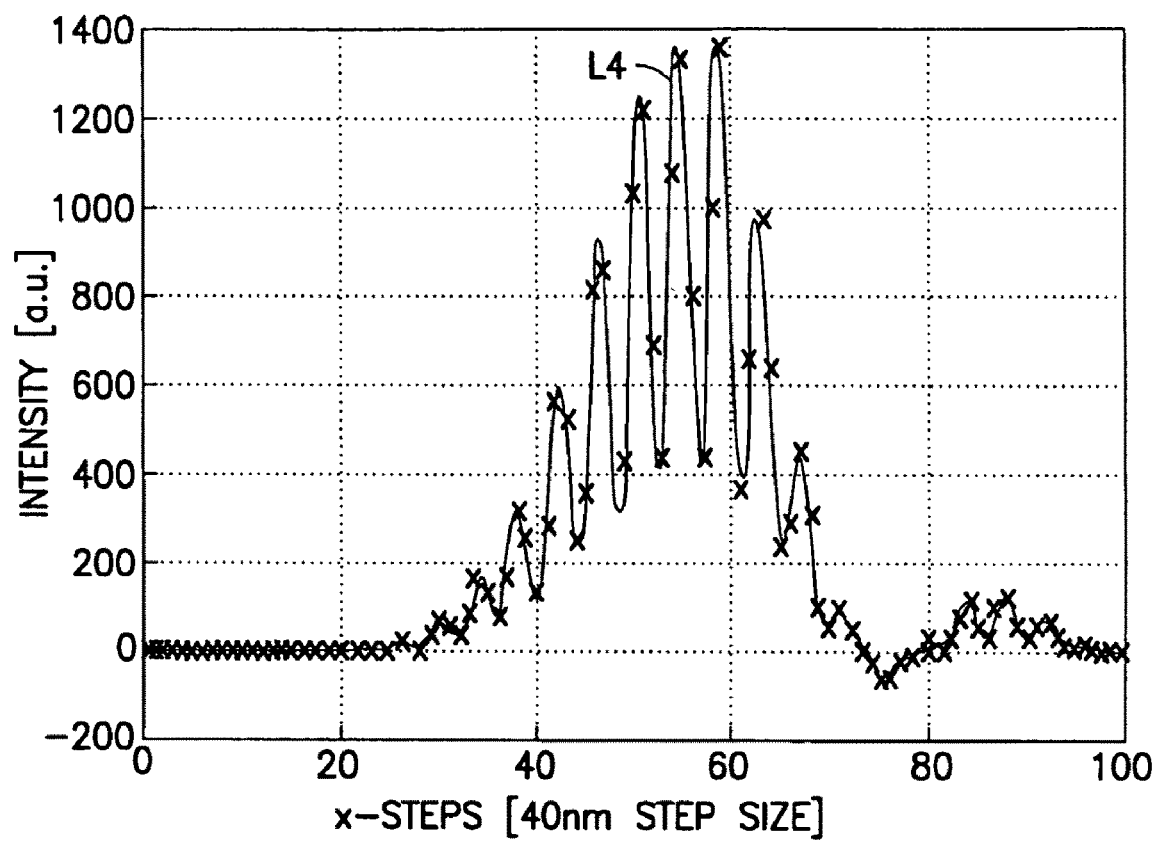

By plotting the detected fluorescence intensity over the object's z-position, the Axial Intensity Distribution (AID), as shown in FIG. 3 is obtained. FIG. 3 shows a simulated Axial Intensity Distribution of an object with a diameter of 100 nm. The axial object size is calculated taking the modulation depth r into account, where $A_1$ and $A_2$ correspond to the amplitude of the inner and outer envelope respectively. The resulting modulation depth r is then related to the object size with a theoretical calibration curve.

In case the focal plane matches an excitation maximum of the standing wave field, the relationship between the acquired axial intensity distribution (AID) from a fluorescent object and its size in axial direction is then given by the modulation depth:

$$r \equiv \left(\frac{I_{max} - I_{min}}{I_{max}}\right) = 1 - \frac{A_1}{A_2} \quad (2)$$

i.e. the ratio between the intensity maxima of the inner ($I_{min}$) and outer ($I_{max}$) envelope of the axial intensity distribution (AID). The modulation depth r (which is defined, similar to a conventional interferometric fringe contrast, as the fraction of the signal which shows a modulation) is related to the modulation contrast R, defined as the ratio between the inner and outer envelopes of the axial intensity distribution, by the formula r=1−R.

The modulation depth is directly correlated to the axial extension of the measured object with a theoretical calibration curve (assuming a given distribution of the fluorophores). The smaller the object the larger is the measured r-value.

Data analysis is then performed with a method according to an embodiment of the present invention, which will be explained hereafter in detail:

Object Size and/or Position Determination

As explained above SMI data evaluation method extracts information about the object size and position from an axial profile taken through the object. There are various methods to extract the modulation depth (a.k.a fringe contrast, the parameter from which size estimates are derived) and/or object position from the experimental data. In order to extract the size and position in a quantitative fashion, a mathematical model function may be fitted to the data. The model function should describe the object and the effects of moth axial modulation and de detections PSF.

Some previous algorithms have relied on manual profile extraction and often some extent of manual start parameter selection. However, this is error prone and time consuming. Furthermore, these algorithms have also exhibited either poor convergence (especially in biological specimens with a poor signal-to-noise or in the presence of an aberrated PSF) or the loss of position information due to symmetrification, and have required extensive manual post-processing.

Some previous fit algorithms had attempted to fit both the $\cos^2$ corresponding to the illumination standing wave and the widefield PSF envelope. For the envelope either a $\text{sinc}^2$ function, the mathematical form expected from the theory was employed or it was approximated with a Gaussian function.

This resulted in a model function similar in form to Eqn. 3:

$$I(z) = A \cdot \text{sinc}^2\left(\frac{z-z_0}{w}\right)(1 - r + r\cos^2(k(z - z_0) + \phi), \quad (3)$$

In this Equation A is a scaling factor, w is related to the width of the envelope, $z_0$ is the position of the object, $k=2n\pi/\lambda_{exc}$ is the wave number, which is inverse proportional to the frequency of the standing wave pattern, $\phi$ the phase offset, and r a measure of the modulation depth.

Such a model function works well in the case of an ideal PSF. When, however, the PSF is aberrated due to, for instance, refractive index mismatch, it no longer correctly describes the data resulting in a poor fit. Thus for example even the small amount of aberration present in a beads sample prepared under optimal conditions has a noticeable effect on the fit efficiency. Some improvement may be obtained by symmetrifying the PSF by Fourier transforming the data, taking the absolute value, and then the inverse transform. However, this results in a loss of position information and in the case of more significant aberration can still be insufficient.

Accordingly, whilst good in principle, the above model function is not a good approximation to the axial intensity profiles actually obtained in an experiment. This disagreement comes from two principle sources a) the averaging over a Region of Interest (ROI) which is normally performed and, much more significantly, b) spherical aberration of the PSF, either due to limitations in objective design, or due to refractive index mismatch in the specimen. In particular, the spherical aberration leads to a significant asymmetry in the observed axial profile making the fit of simple, symmetrical functions to the axial profiles problematic. What is more, the exact nature of this aberration and hence of the form of the profile are highly specimen dependant. The effect averaging over a region of interest less significant than the spherical aberration and could, in principle, be accounted for by e.g. fitting a Gaussian instead of $\text{sinc}^2$. As to the spherical aberration it is generally possible to fit a more complicated PSF model which includes a parameterised spherical aberration.

Preliminary attempts to take account of the above aberrations removed the asymmetry in the PSF by taking the Fourier transform of the data, taking the absolute value of this, and transforming back into real space. This allowed a reasonable (if still not ideal) approximation with a Gaussian, but had the disadvantage of loosing all spatial information. There are also potential issues when, e.g., no background is subtracted and the values at the top and bottom ends of the axial profile are different (breaking of the periodicity/cyclicity assumption in the FFT). In additions to the shortcomings of the model function in the initial work mentioned above, significant manual "tweaking" of start parameters was typically required to get a good fit, making the process time consuming and not suitable for automation.

The method according to an embodiment of the present invention helps to alleviate the above problems by estimating the envelope from the data itself, in effect fitting only the component due to the illumination structure, resulting in the following model function.

$$I(z) = A \times \text{Env}(z)(1 - r + r\cos^2(k(z - z_0) + \phi) \quad (4)$$

Again in this equation A is a scaling factor (which may be also equal to 1), $k=2n\pi/\lambda_{exc}$ is the wave number, $\phi$ is the phase offset, and r is the modulation depth.

The method is based on the recognition that the interesting position and size information is contained entirely in the second modulation term of Eq. 3 and that the envelope may be removed from the fit itself and determined instead from the data beforehand.

The empirical envelope Env(z) can be extracted by low pass filtering the data to remove the extra frequencies introduced through the illumination structure and obtain a curve, which would be obtained from a normal widefield microscope. The low pass filtering of the axial profile to obtain the envelope estimate may be a low pass filtering with a Gaussian kernel. Other filtering methods, such as for example Butterworth filter, may be also employed.

In one embodiment the background at the location of each of the automatically detected signals is subtracted and the following function is fitted to an axial profile (AID) extracted for each signal:

$$I(z) = A \lfloor (1-r) + r \cdot \cos^2(k(z-z_0)) \rfloor \cdot I_{smooth}(z) \qquad (5)$$

In Equation (5) A denotes the amplitude, k the wave number, z the axial position of the object slide and $z_0$ the displacement of the observed modulation pattern with respect to the origin. The modulation depth is represented by r and $I_{smooth}(z)$ is the axial profile as it would appear in the absence of the standing wave field. $I_{smooth}(z)$ is obtained by applying a low-pass filter to the Axial Intensity Distribution.

The above model function according to Eq. (4) or (5) may be fitted using for example a standard Lavenburg-Marquart solver, solving the weighted least squares problem with variances estimated using for example a combination of Gaussian distributed camera readout noise and the expected Poisson photon statistics.

In particular, due to the probabilistic nature of image formation, the noise in the images is expected to follow a Poisson distribution, although a small Gaussian component from the detector read out noise is also expected. A weighted least squares algorithm where the variances of each pixel are assumed to be proportional to the pixel intensity plus a small constant term corresponding to the camera read out noise of $\sigma=4$ counts may be used in one embodiment. As well as modelling the system response, the small constant term serves to improve the stability of the fit in the presence of low pixel counts, an area where the use of intensity dependant weights is traditionally problematic.

Alternatively a maximum likelihood fit may be used. Both methods produce comparable fit accuracy. The least squares method may in addition produce sensible error estimates for the fitted parameters.

Still in another embodiment an unweighted least squares and weighted least squares algorithms without the small constant term may be used. Compared to the least squares method using the small constant term described above, these method produce, however, worse results.

In one embodiment the fits may be performed using a Levenberg-Marquardt nonlinear weighted least squares fitting algorithm.

One side effect of removing the envelope from the fit is that although there is still position information from the position of the interference fringes, the fit no longer contains information about the location of the PSF envelope. This information is necessary in order to remove the ambiguity introduced by the periodic nature of the illumination structure. Accordingly, in one embodiment the algorithm extracts the position of the envelope separately using a modified Centre of Intensity (COI) based approach and uses this to resolve the ambiguity in the fringe based position.

The method for data processing according to an embodiment of the present invention helps to overcome several of the shortcomings of the previous methods. The method is robust against PSF aberration whilst retaining position information. It requires very little post-processing and, when coupled to an object finding algorithm according to an aspect of the present invention, allows the whole process to be automated.

Start Parameter Selection

In one embodiment the method comprises automatic start parameter selection. With a proper selection of appropriate start parameters to ensure convergence the robustness of the automated fitting process may be facilitated. The start parameters to the fit can be automatically extracted from the profile by finding the locations of the central maximum, the next fringe on one side, and the local minimum between the two. This allows rough estimates of all relevant parameters to be made.

To increase the accuracy of these estimates (particularly that of standing wave period), the data can be interpolated using for example lowpass interpolation prior to estimation. It has been surprisingly discovered that the accuracy and hence the convergence rate of the fit can be substantially improved (for example from ≈95% convergence to ≈98%) by interpolating the data points before start parameter estimation.

The start parameter estimation can be then performed in the following manner:
1) Find the global maximum
2) Find the local maximum situated at approximately half the expected wavelength from the global maximum
3) Find the local minimum between these two maxima Given the location and magnitude of these points, starting values for the actual wavelength, the modulation depth, and the phase of the modulation may be calculated ($\lambda$, r and $z_0$ respectively in Eqn. 4 and 5).

The relationship between object size and fringe contrast $\beta$ or respectively modulation depth r has no analytic inverse, so in one embodiment object sizes are previously determined graphically from the measured contrast. This step can be been replaced by computing a numerical solution after each fit. A correction, respectively calibration for unequal beam intensities may be also implemented.

The fit process is schematically depicted in FIG. 4. FIG. 4a shows the raw intensity values from an axial profile through a bead image. FIG. 4b shows the raw data with interpolation (line L1) and estimate of the PSF envelope (line L2) derived through low pass filtering. FIG. 4c shows the result after low pass filtering with a stronger filter as the line L3. The fit is performed over the region where the envelope is higher than this line. FIG. 4d shows the position and height of the maximum, adjacent peak, and the minimum between the two, which are used to estimate start parameters for the fit. FIG. 4e shows the result of performing the fit as a thick line L4.

In addition to the axial profile, a 2D Gaussian may be fitted to an average projection of the slices in which the object is in focus (≈±200 nm above and below the axial maximum of the object). This allows a precise determination of the object position in the X-Y plane. It is also possible to estimate the lateral extent of the object based on the FWHM of the fitted Gaussian. The Gaussian fit may also be used to determine a background value for the axial fit, eliminating the need for the subtraction of a background region of interest (ROI).

Quality Control

Although it is possible to fit most signals, there may be cases when the fit does not converge to a sensible solution. There are three main reasons for this: insufficient signal-to-noise ratio, a false-positive object detection/identification, or an object size significantly larger than 200 nm.

Accordingly in one embodiment, the method comprises a post-processing step to reject nonsensical solutions. To this extend conventional goodness of fit measures such as Chi-squared may be used. There may be, however, cases where these measures may not be—on their own—sufficient to discriminate between good and bad fits to SMI profiles. One of the reasons for this is probably the periodic nature of the model function, and hence the goal function—there will be multiple minima in the goal function, all of which have a low $\chi^2$, only one of which, however, is the real solution.

A robust estimate of quality of fit can, on the other hand, be obtained by comparing the fitted wavelength to the laser wavelength (in medium). In one embodiment a combination of a set of conditions on the fitted wavelength, $\chi^2$, and the fitted modulation depth (should be between 0 and 1) may be used.

Furthermore, a comparison of size estimates obtained using background subtraction, and those using a background estimate based on the lateral fit may be used to control the quality control of the fit.

The whole process of data evaluation may be automated, with the intensity profiles required from the fit extracted at the location of each object found during the object identification step. Some manual intervention may be required at the start to determine a suitable threshold range for the particular class of specimen, after which the rest of the analysis can be unattended.

Object Detection/Identification

SMI size estimation is particularly useful for small point like, optically isolated objects, so that the method for data (or image) analysis according to an aspect of the present invention comprises a step of object detection or identification, in which at least a substantial part of all point like objects within an image are detected or identified.

Previous use of the SMI technique had relied on the manual selection of the points of interest, hindering automation of the data analysis process. One further approach is to subject the image to a simple thresholding. Approaches based on simple thresholding are, however, both subjective and do not perform well given either densely clustered objects or a large range of object brightness. Many SMI images fall into both of these categories. The most important reasons as to why approaches based on simple thresholding do not perform well with SMI images are summarized below.

Non-uniform background: In most interesting biological specimens the background is not uniform. The source of this background is typically auto-fluorescence, non-specific labelling, or a combination of both. It is common for the background level in some parts of the image to be higher than the intensity of the points in areas of low background, thus ruling out a single threshold.

Presence of structures which are not point-like: This can be considered as a specific case of non-uniform background.

Large variation in object intensities and object clustering: In typical biological specimens it is quite common to have a range of signal intensities which span 2-3 orders of magnitude. This presents a hurdle to simple thresholding as, due to the limited resolution, two separate signals which are close together will be detected as one if a threshold low enough to detect weaker point is used.

Noise: The images obtained with the SMI microscope are typically contaminated with noise.

According to an embodiment of the present invention, an object detection or identification method combining filtering and detection at multiple thresholds is suggested. One of the advantages of this method is that it allows independent detection or identification of objects over a wide range of intensities and with a moderate degree of clustering.

The method for object detection comprises a first step of passing the obtained data through a low pass filter followed by a high pass filter. The combination of these filtering operations constitutes a band pass filter and could also be implemented directly as such. The resulting image is free of both noise and of larger objects/background.

The low pass filtering of the data reduces the influence of noise. The low pass filter may be implemented as a convolution with a Gaussian smoothing kernel, although various other implementations are equally possible.

Following the low pass filtering, a copy of the image is convolved with a broader ($\approx 2\times$ the PSF width) Gaussian filter and subtracted from the original smoothed image. This has the effect of a high pass filter.

In one embodiment, the first step comprises filtering with a narrow ($\sigma \approx 1$ pixel) lowpass Gaussian filter, followed by a slightly wider ($\sigma \approx 3$ pixels) Gaussian highpass filter, wherein $\sigma$ denotes the standard deviation.

The resulting bandpass filter serves to suppress both noise, and any objects (including a non-uniform background) which are larger than a few pixels. The concept is similar to that of scale spaces, and has the effect of restricting the image to those features which are of a size interesting for SMI microscopy. Larger objects—for example chromosome territories—which are inhomogeneous will be reduced to a set of foci corresponding to those features of the structure at the scale to which the filter is sensitive.

This restriction of the signal to a band of frequencies at the top end of those passed by the microscope system has surprisingly proven to be very effective at selecting point-like structures. In contrast to several forms of optimal filtering, knowledge of which objects are uninteresting is also implicitly included. The normal optimal filtering for point like objects, on the other hand, would be to correlate the image with a copy of the PSF. It has been realized, however, that this does not provide a good rejection of large scale features.

Following this the image is processed at progressively decreasing thresholds with the objects found at each threshold being removed from the image before proceeding to the next threshold.

In order to remove the objects found at each step, in one embodiment the thresholded image is blurred with a Gaussian approximation to the PSF and subtracted from the working image. This means that bright objects will disappear from the image upon detection, allowing weaker objects in their vicinity to be detected in subsequent steps.

In one embodiment a PSF estimate which is slightly too large may be used. This helps to avoid the case, in which the used PSF estimate is too small, so that the subtracted signal is smaller than the real image of the object, leaving a doughnut shaped structure which could be detected again at lower thresholds.

According to another embodiment, starting at the highest threshold, the threshold is applied to the image, and objects are detected using a standard labelling algorithm. An estimate of the form the detected objects would have taken in the image is obtained by applying a suitable weighting (which may be determined at least partially based on empirical data) to the masked image and convolving this with an approximation to the microscope PSF. A Gaussian approximation may be used to this extend. This estimate is subtracted from the working image and the procedure repeated for the next lower threshold level.

The threshold range over which the above iterative object finding/removal is applied may in one embodiment be determined semi-automatically, as follows:

The upper threshold is determined to be half the maximum intensity in the filtered image. Surprisingly, this arbitrary determination of the upper threshold provides good results in a wide variety of samples.

The lower threshold is then estimated from an analysis of the intensity histogram of the filtered image. If it is assumed that the most commonly occurring value(s) in the image correspond to the background, the lower threshold is then derived by multiplying the intensity corresponding to the maximum of the histogram with a user defined factor. This factor allows various different signal to noise/signal to background situations to be accommodated. The value of this factor can typically remain constant over different samples with the same type of labelling and similar acquisition parameters.

Between these two bounds, the remaining thresholds may be distributed logarithmically. Based on empirical data, this results in a similar number of objects being detected at each step. The number of thresholds used may vary. In one example 10 thresholds are used.

The above described object finding algorithm is not restricted to SMI data, and can also be used successfully on other forms of microscopic data, for example data obtained by a CLSM.

If the threshold at which a point is detected is recorded along with that point's position, it is possible to determine a suitable threshold a posteriori.

Although the object finding method described above can generally identify objects over a range of similar images using one lower threshold factor, there may be still cases when this proves difficult. If the threshold level at which each point was detected is recorded, it is possible to deliberately set the lower bound of the threshold range too low. Some noise will thus be identified as points, and subjected to the fitting process. This will however not be well described by the model function, resulting in nonsensical fit. By analysing the dependence of quality on fit on the threshold, the threshold level can be set a posterior, discarding all those points detected at and below the threshold where a significant proportion of points are not fitting.

In one embodiment, this can be realized by taking all points which had successfully fitted above a threshold level, where 95% of all points, which would have fitted if the whole of the original threshold range was taken, have been detected.

Adaptation to 4Pi

The above described data (or image) processing and analysis method can easily be applied to other microscopic data, for example to 4Pi data, the only change required being a new model function which corresponds to the obtained microscopic images, for example 4Pi images.

The model function used for 4Pi data analysis may be as follows:

$$I(z) = h(z|z_0, w, n/\lambda, \phi) * p(z|r), \qquad (6)$$

where $h(z)$ is the axial component of the PSF, $p(z)$ the projection of the Fluorophore distribution along the z-axis, and the * operator represents convolution.

The PSF may be approximated as:

$$h(z) = \mathrm{sinc}^2\left(\frac{9}{5}\frac{z-z_0}{w}\right)\left[\mathrm{sinc}^2\left(\frac{z-z_0}{w}\right)\cos^2\left(\frac{2\pi n(z-z_0)}{\lambda}+\phi\right)\right], \qquad (7)$$

where $z_0$ is the z-position, w is related to the width of the envelope, n is the refractive index of the medium, $\lambda$ is the excitation wavelength, and $\phi$ an arbitrary phase offset.

The object model used can be a sphere, giving a parabolic axial projection:

$$p(z) = \begin{cases} I_0(r^2 - z^2) & z \in [-r, r] \\ 0 & \text{else} \end{cases} \qquad (8)$$

where $I_0$ is the object intensity, and r the radius.

The above described object finding and/or fit methods can then be applied to 4Pi images.

Similarly, the above described object finding and/or fit methods can also be applied to images obtained by other far field microscopic methods.

Thus for example, the above described object finding method may be applied to images obtained by CLSM. The operation of the object finding routines on confocal data is analogous to their operation on SMI data. In particular, the same code may be used in each case. The one parameter which could potentially be varied is the sizes of the Gaussians used for the filtering operations and to approximate the PSF, since these should be matched the resolution of the imaging system. In one implementation these sizes may be specified in pixels. Using Nyquist based sampling in the measurements, the (pixel) set parameters generally work well for a range of applications, without the necessity of changing them.

Similarly, the above described fit method may be applied for example to images obtained by microscopic methods using structured illumination techniques. The above described methods for object finding and object size and/or position determination may be fully automated. The methods may be integrated into a MATLAB (The MathWorks, Inc., http://www.mathworks.com) environment which also enables Grafical User Interface (GUI) interactions. The methods may be a part of an overall software package for data analysis and control. The software package may include additional software routines like specific operating procedures for the axial sampling unit (P-621), computer controlled heat supply, or perfusion during live cell measurements.

With the fully automated data analysis tools respectively methods and systems as described previously, it is possible to apply an SMI microscope for stable, high precision light optical measurements of biological samples below the conventional "Abbe-Limit". In particular, in one embodiment it is possible to carry out studies on structural intact specimens without using destructive procedures like cryosectioning and fixation respectively of the specimens. In addition, live cell imaging enables the "real-time" observation of e.g. physiological processes. This is an advantage over other high resolution techniques such as Electron Microscopy (EM).

In one further embodiment the SMI microscope has an upright or vertical configuration (short vertical SMI). In the following, an example of a SMI microscope with a vertical arrangement will be described in greater detail.

The vertical configuration enables a horizontal positioning of the object slide. Furthermore, the vertical setup allows for easy integration of water immersion objective lenses if necessary. The vertical setup additionally allows an easy implementation of an incubator chamber and flow control systems for keeping the specimens alive. The overall optical system may be constructed to be very stable and compact. In one embodiment the vertical SMI microscope comprises an aluminium frame which is placed on an optical table and an optionally an incubator chamber.

Two different optical configurations with oil and water immersion objective lenses respectively may be used. Depending on the biological sample and the kind of preparation, the environment of the biological sample will have a different refractive index, requiring appropriately corrected optics. As living cells are usually in aqueous media, the use of water immersion objective lenses is desirable.

Optical Layout

The optical layout of a vertical SMI microscope generally corresponds to that shown on FIG. 1. However, the optical axis of the system (i.e. the z-axis) is substantially vertical.

Figure 5:
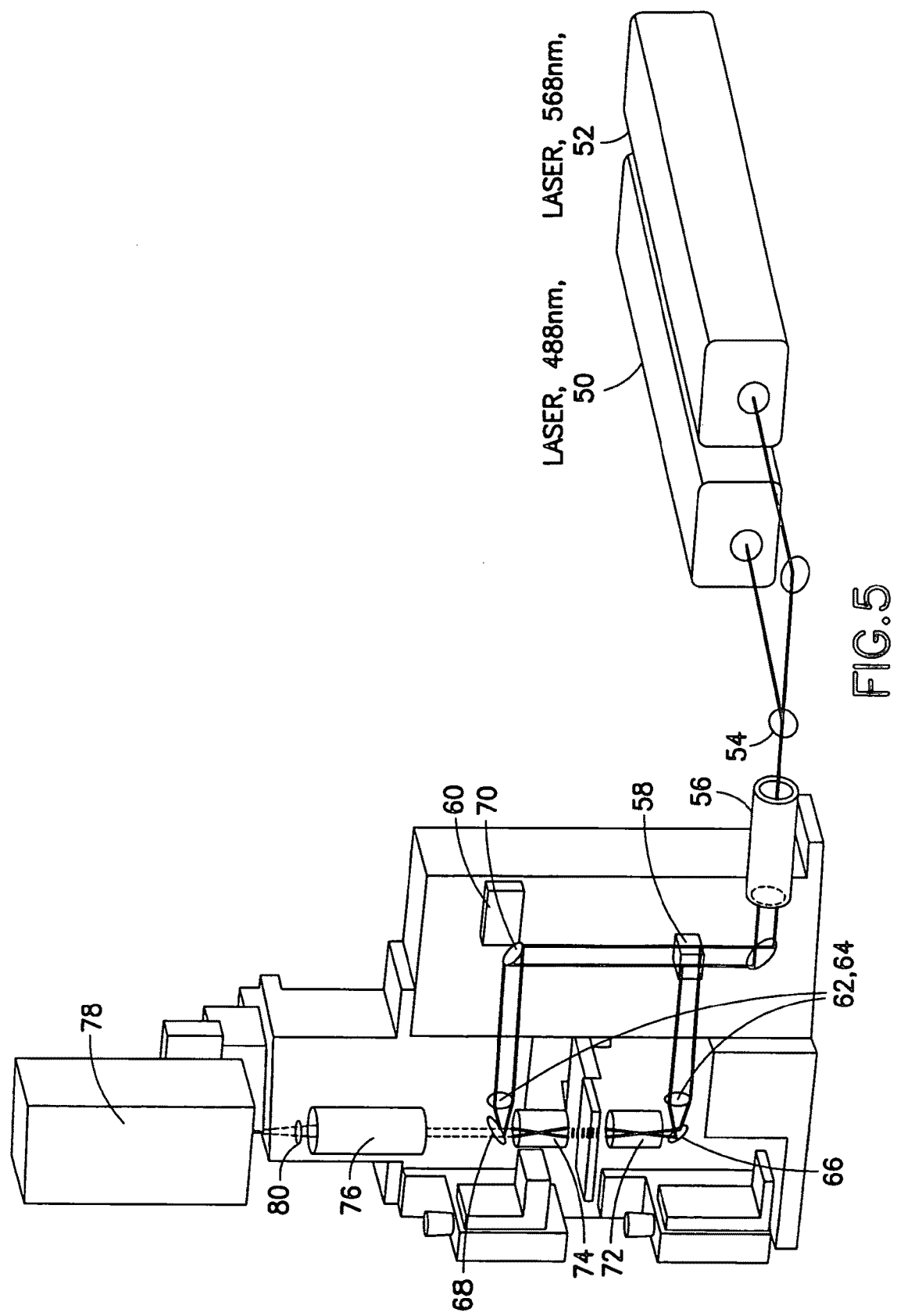
FIG. 5 shows a CAD model of an optical setup of an example of a SMI microscope with a vertical arrangement.

FIG. 5 shows an overview of the optical layout of a vertical SMI microscope with two excitation lasers.

The collimated incoming light of an argon ion laser 50 (for example from Spectra-Physics, Newport, Germany) and a krypton ion laser 52 (for example Lexel 95, Lexel Laser, USA) are operated at wavelengths of 488 nm and 568 nm respectively, and with intensities in the range of 50-200 mW. Both lasers may be operated in TEM00-mode. In one embodiment it is possible to switch between the two laser sources via shutters, electronically controlled by the control software.

The two laser beams are overlaid by means of a dichroic mirror 54. The two beams may be further cleaned up from the laser plasma light by means of a respective cleanup filter with a spectral accuracy of about ±5 nm. The overlay beam is expanded by a collimator 56 to a beam diameter of approximately 10 to 15 mm, and split by a 50:50 non-polarizing beam splitter 58 (for example from Edmund Optics, Karlsruhe, Germany) into two laser beams of substantially equal intensity and polarization. The collimator 56 may for example comprise two achromatic, convex lenses with focal lengths f=20 mm and f=100 mm respectively, arranges at a distance of 120 mm. One of the beams is then reflected by a mirror 60 positioned at an 45° angle with respect to the incoming beam. The mirror 60 may be a metal coated mirror with a diameter of about 25 mm. The mirror 60 may for example be attached to a kinematic mirror holder. The mirror holder may comprise a piezo electrical stage 70. Thus, the wavefield in the object space can be translated axially with a high (for example nanometer) precision.

The two expanded and collimated beams are then focused by respective focusing lenses 62 and 64 into the back focal plane of the two objective lenses 72 and 74 through which the standing wave field is established in the object space. The beam coming from the lower focusing lens 64 is directed to the (lower) objective lens 72 via a mirror 66. The beam coming from the upper focusing lens 62 is directed to the (upper) objective lens 72 via a dichroic mirror 68, which reflects more than 95% of the two excitation laser lights having wavelengths of 488 nm and 568 nm respectively. The dichroic mirror 68 transmits the Stokes-shifted emission parts of the detection light.

With the implementation of either oil or water immersion objective lenses (for example oil/water immersion Lenses, 63×, NA=1.4/1.2 from Leica, Bensheim, Germany) two different optical configurations are usable which require a realignment of the optical pathway in each case.

The lateral and the axial position of the focusing lenses 62 and 64 may be controlled for example by a respective three-axis lens positioner. The focusing lenses 62 and 64 may be fixed via the respective three-axis lens positioner to a respective objective holder. Thus, a there is possible to adjustably control the focusing in the back focal plane of the respective objective lenses 72 and 74. For example the following configurations are possible:

Configuration 1: two water immersion objective lenses (for example HCX PL APO, 63×, NA=1.2, from Leica) and two achromatic focusing lenses having focal lengths f=60 mm and diameters of 18 mm;

Configuration 2: two oil immersion objective lenses (for example HCX PL APO, 63×, NA=0.7-1.4 from Leica) and two achromatic focusing lenses having focal lengths f=80 mm and diameters of 18 mm.

The detection follows a conventional Epifluorescence far-field arrangement. The emitted fluorescence detection light collected by the (upper) detection objective lens 74 is separated from the excitation light with the help of the dichroic mirror 68 (for example F52-489, AHF Analysentechnik AG, Tübingen, Germany) and focused with a 1.0× tube lens 76 (for example Leica, Bensheim, Germany) onto the CCD chip of a cooled black-and-white CCD camera 78 (for example Sensi-Cam QE, PCO Imaging, Kelheim, Germany). The camera 78 may be for example a highly sensitive 12 bit back-white camera with a peak quantum efficiency of approximately 65% and noise of about 5e-rms. In one embodiment the CCD camera 78 has a CCD chip with 1376×1040 pixels. In one embodiment the objective lens 74 and the tube 76 lens are specifically matched to each other, in order to avoid spherical and chromatical aberrations. Furthermore, the tube lens 76 may be specifically matched to the CCD camera 78 and in particular to the pixel size of the CCD chip.

An additional blocking filter 80 (for example F73-491, AHF Analysentechnik AG, Tübingen, Germany) in front of the CCD chip blocks residual back-reflected laser light.

For an optimal holding and alignment of the tube lens 76 and the blocking filter 80, the entire optical path of the detection beam may be arranged within a tube system, which may be connected to the camera opening by a so called C-mount. The tube system has an additional effect of shielding the detection signal from an unwanted light from the surrounding environment. In one embodiment the tube system allows flexible positioning in the axial direction of the tube lens 76 relative to the CCD chip of the CCD camera. This facilitates the localizing of the precise focal point. The CCD camera may be attached to the 3-axis linear translation stage. This enables an optimal positioning with respect to the optical axes of the vertical SMI microscope.

Furthermore the setup allows an easy switching between different filter sets and emitters for particular applications and excitation wavelengths.

The additional piezo electrical stage 70 (P-753, Physik Instrumente, Karlsruhe, Germany) placed inside the interferometer enables the adjustment of the wave front position. The wavefront position may be adjusted with nanometer accuracy in the axial direction.

During the measuring process immersion medium is provided between the slide holder and the objective lenses in order to obtain a match in the refractive indexes. As immersion medium water with a refractive index n=1.33 (Water immersion objective lenses) or oil with a refractive index n=1.52 (oil immersion objective lenses) may be used.

Since the upper objective lens 74 is also used for detection, the upper objective lens represents also a reference point for the complete interferometer. In one embodiment the upper objective lens 74 may be moved only in the axial direction. The lower objective lens 72 may be movable in three directions. To this extend apart from the axial linear translation stage there may be provided two additional precision linear translation stages (for example M-106.10 from Physics Instruments) for moving the lower objective lens in the lateral x and y directions.

Sample Positioning

For the coarse sample, respectively object positioning prior to the actual measurement, translation stages (M-505

(x-axis), M-112 (y-axis) and M-110 (z-axis), for example from Physik Instrumente, Karlsruhe, Germany) with a positioning accuracy down to 50 nm are used allowing maximum flexibility under consideration of the geometry of the setup. Furthermore these units show an absolute positioning stability even under higher temperatures which is important for the data acquisition since the position of these stepper motorised stages is then kept constant.

For the axial sample, respectively object sampling during acquisition the use of a piezo electrical stage with a capacitive control system (P-621, Physik Instrumente, Karlsruhe, Germany) provides a positioning accuracy better than 10 nm in the closed-loop mode.

Figure 6:
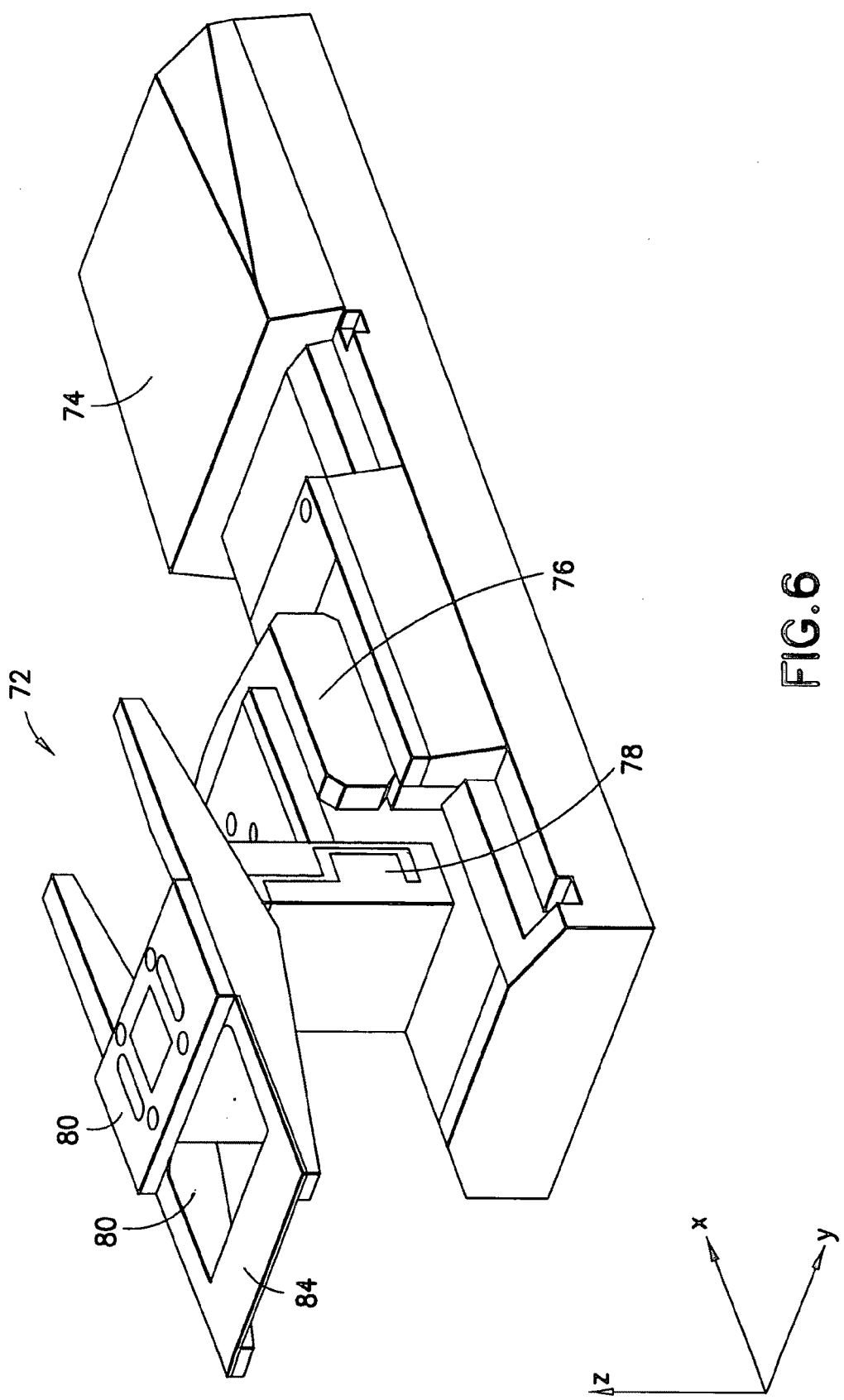
FIG. 6 shows example of a sample positioning unit.

One example of a sample positioning unit 72 (which is an example of a sample holder) is shown on FIG. 6. The sample positioning unit 72 comprises a stepper motor 74 for translation in the x-axis, a stepper motor 76 for translation in the x-axis, a stepper motor 78 for translation in the x-axis and a pieso electrical actuator 80 for the axial object sampling. The sample positioning unit 72 comprises furthermore a slide holder 82. The slide holder 82 may be positioned directly onto the actuator 80. The reference sign 84 indicated an object slide.

The stepper motors 74, 76 and 78 are high precision stepper motors. In one embodiment the stepper motors exhibit absolute vibration free positioning accuracy. Thus, the position of the stepper motors may be maintained during the whole scanning interval, also under in-vivo conditions (i.e. under temperature of about 37° C.). The pieso electrical actuator 80 allows for axial object sampling with a nanometer accuracy. As a pieso electrical actuator 80 it is important to select a high precision, high stability, linear pieso electrical actuator 80.

The stepper motors 74, 76 and 78 may be computer controlled using for example the commercial control software provided by the manufacturer. The pieso electrical actuator 80 may be controlled directly utilizing conventional ASCII instruction sequences.

The piezo electrical actuator may be operated in an uncontrolled or a controlled mode. When operating in an uncontrolled mode (or so called open loop mode) the displacement of the pieso electrical actuator is proportional to the voltage. One advantage of this mode may be the higher speed. Disadvantages of this mode may be, however, the occurrence of hysteresis and non-linearities. In order to avoid such effects the controller may be operated in a controlled mode (or the so called closed-loop mode). In this mode, the movement of the piezo electrical actuator is measured directly via for example a capacitive sensor, thus allowing the absolute position to be determined. Consequently, hysteresis and non-linearities can largely be avoided. Further advantages of the closed-loop mode may the achievement of very high resolution and/or precision.

The movement of the pieso electrical actuator may be synchronized with the detected data sequence, respectively with the CCD camera during data acquisition.

Thus for example, the piezo electrical actuator may be only allowed to move to the next position when the image has been recorded by the CCD camera, i.e. the piezo movement depends on the integration time given by the CCD camera. This feature may be implemented in the control software.

The whole sample positioning unit 72 may be fixed to a solid aluminium block, which is fixedly integrated in the basis construction or frame of the vertical SMI microscope. The design of the vertical SMI microscope may be adapted to the maximum travel range of the stepper motors, such that in principle any arbitrary position on sample can be scanned.

In one embodiment the piezo electrical stage used for the axial object sampling is calibrated (for example for the weight of the object slide holder) in order to improve data acquisition (DAQ). This enables a more stable and rapid operation in the closed-loop mode. Additional correction terms may be implemented in the control software of the pieso-electrical stage in order to assure more stable and rapid operation in a closed-loop mode.

A high data acquisition rate is of particular importance for in-vivo measurements, in order to minimize the effect of object movements on the detected signal. Simultaneously it is important to maintain a high stability, in particular a high linearity and accuracy of positioning over the whole range of object translation (i.e. over the whole object scanning range). Additionally a specific conditioning of the SMI microscope for different operating temperatures may be implemented. The only restriction concerning a rapid data acquisition is consequently given by the number of photons reaching the CCD chip of the camera per time slice, thus defining a limitation given by the integration time. And since living cells show a higher background in comparison to fixed cells and also the signal-to-noise Ratio (SNR) when using water immersion objective lenses for collecting the emission light is not as good as for oil objective lenses, the signal detection demonstrates the crucial factor in this context.

In one embodiment the slide holder 82 has a symmetrical construction. This reduces the influence of additional gradients on the pieso electrical actuator 80, which may cause errors in the positioning. Furthermore, the slide holder 82 may exhibit a plurality of cavities, in order to reduce the overall weight of the slide holder 82 and thus prevent overloading the pieso electrical actuator 80.

Data Acquisition

Due to the collimated beam in the object space the complete lateral focal plane can be imaged simultaneously. For data acquisition (DAQ), the objects or samples to be analysed only have to be scanned in one dimension (axial) which leads to more rapid DAQ-rates in contrast to confocal microscopy techniques, which employ row- and column scanning of the analysed object or sample. Due to the high data acquisition rate, the unwanted influences of Brown's motion of living objects can be reduced substantially.

For example, under the condition of a acceptable signal-to-noise ratio between the object and the background and a reduction of the visual field of the CCD-camera or under the definition of a region of interest of about 15×15 $\mu m^2$ (corresponding to a typical cell size), a complete three dimensional set of images can be acquired for less than 2 sec. This corresponds to a data acquisition rate at about 15 Images/sec.

The acquired three dimensional (3-D) data sets can be directly transmitted to a computing system comprising a storage unit for storing the 3-D data sets and a processing unit for performing the above described object detection and image processing methods on the stored data. The computing system may be a conventional computer or a network of computers, which are respectively programmed, i.e. which are running program comprising machine readable instructions for carrying out the steps of the method for object detection and microscopic image processing of an embodiment of the present invention. The detection and measurement of each object may be carried out full automatically without the need of further user intervention or deep mathematical knowledge of the user. Different diagrams visualising the detected and measured objects, the resulting size distributions, average values and standard deviations may be also computed and shown to the user.

Figure 7:
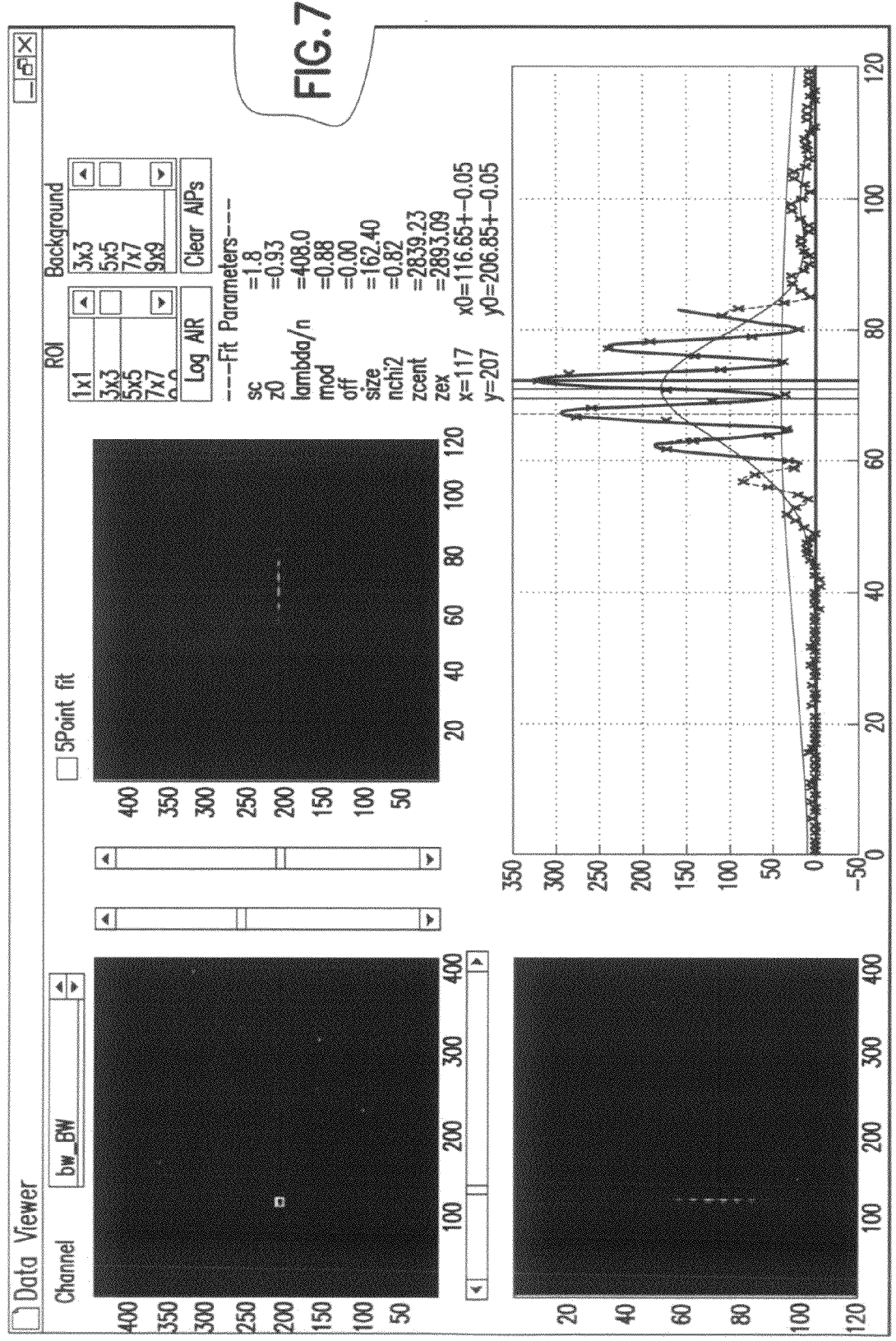
FIG. 7 shows an example of the graphical user interface of the automated software evaluation and control tool.

In one embodiment the object detection method and the object size and/or position determination method may be implemented as separate modules, which may be part of an overall control and data evaluation software package. The modular structure of the software allows for easy integration of additional software modules, for example additional software modules for specific analysis. FIG. 7 shows an example of a graphical user interface of the software module for object detection and image analysis. In this case the results of the detection and measurement of a 44 nm calibration object (axial intensity distribution) is shown.

In-vivo Instrumentation

Incubator Chamber

When the SMI microscope is used for in-vivo measurements, it may further comprise an incubator chamber. The incubator chamber encloses the whole setup, except for the CCD camera (due to the need to cool the CCD chip and the electronics) and the lasers. The provision of incubator chamber enables the establishment of an autarkic atmosphere with constant temperatures up to 50° C. and an accuracy of ~0.1° C. The incubator chamber may be for example made of Plexiglas and connected via respective connecting ports to a system for temperature control.

For nutrition of the cells and the transport of $CO_2$ a micro perfusion chamber may be provided.

Figure 8A:
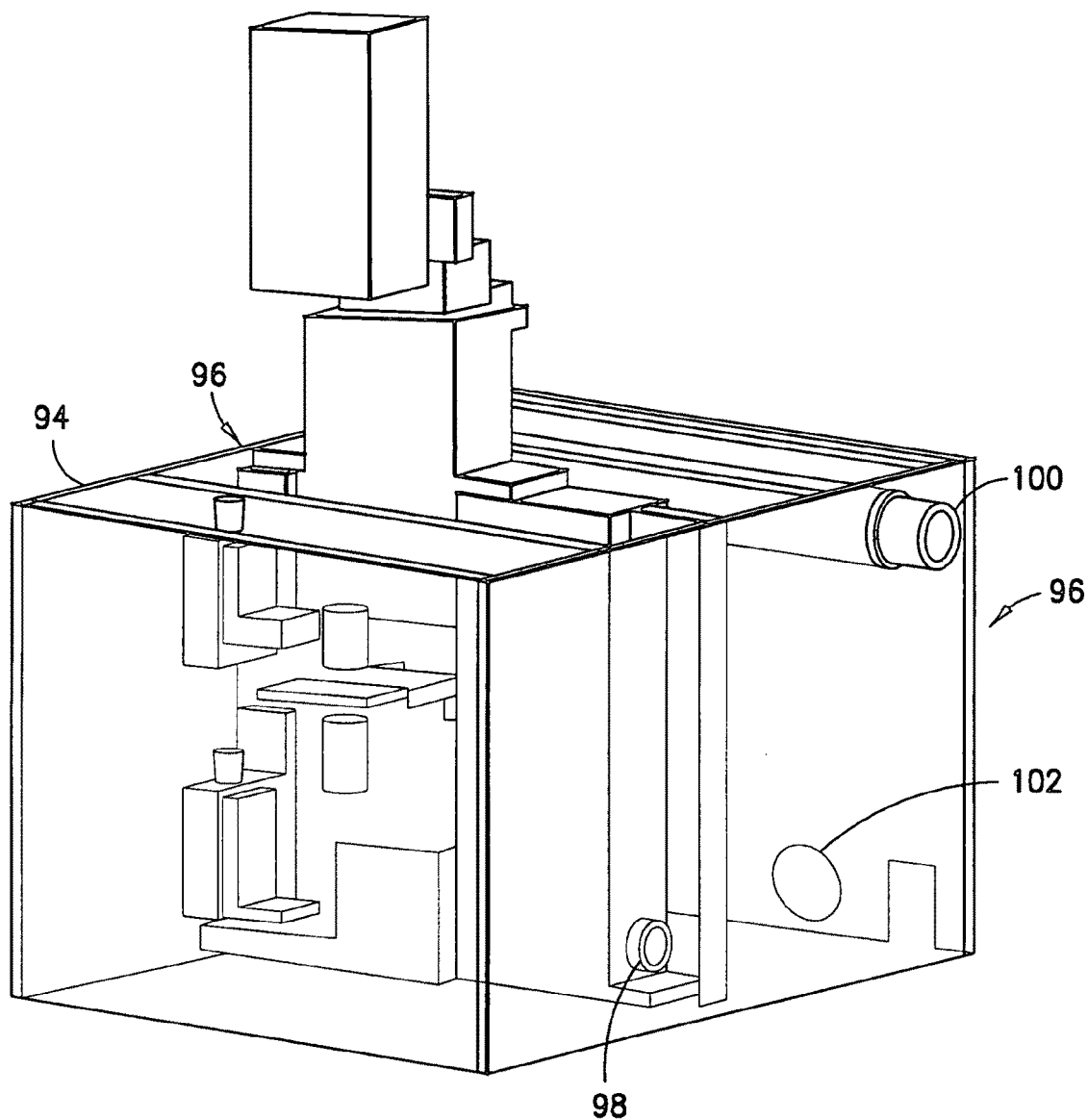
FIGS. 8a,b show examples of a vertical SMI microscope with closed incubator chamber.
Figure 8B:
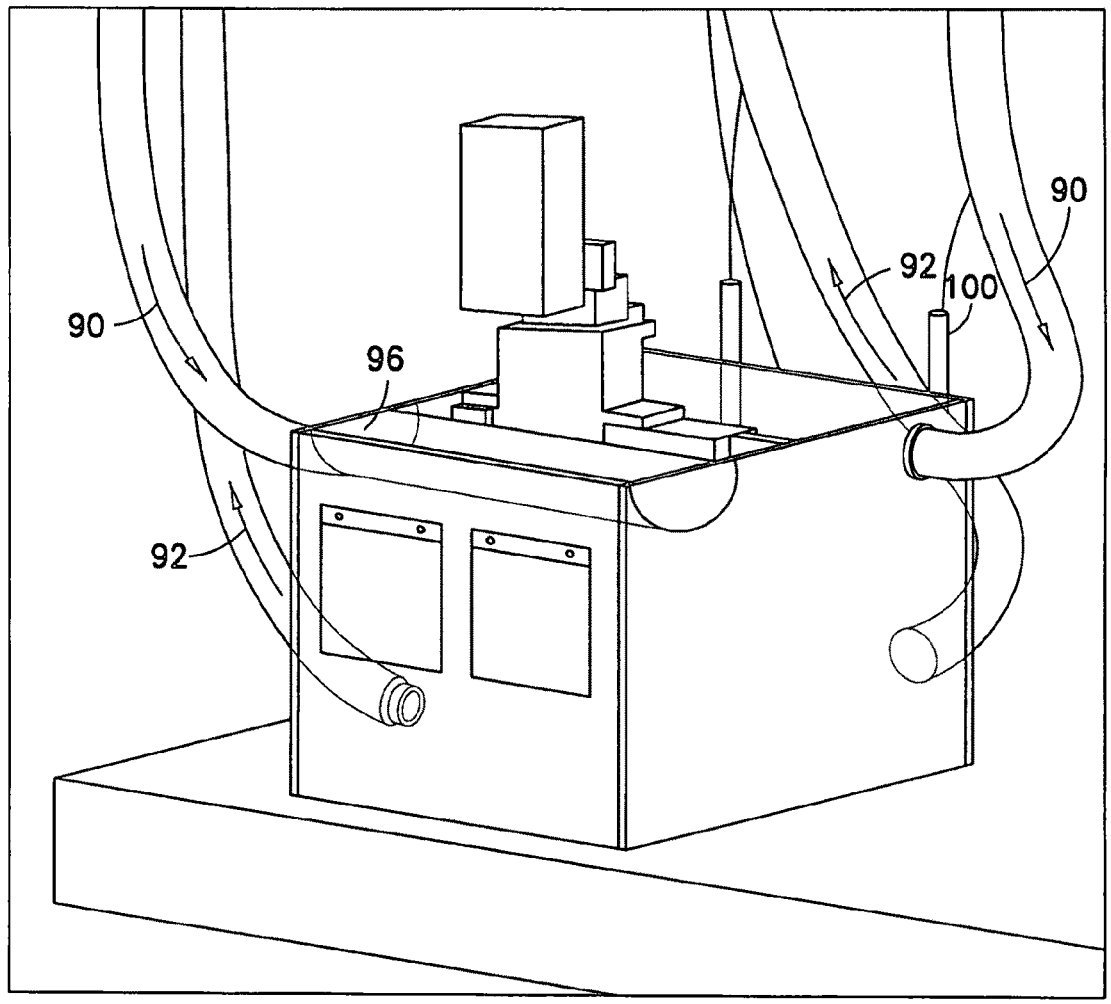

FIG. 8a shows a CAD model of an example of a vertical SMI Microscope with closed incubator chamber. FIG. 8b shows a photo of a vertical SMI Microscope with closed incubator chamber according to one embodiment of the invention. The arrows 90 indicate the supply with heated air. The arrows 92 indicate the transportation back to the temperature control unit, thus completing the cycle.

To allow an easy alignment of the optical pathways and electronic components, the incubator chamber may be designed in a modular way. The incubator chamber may for example comprise a front part 94 and a back part 96, which may be removed independently of each other thus for example facilitating the access to the optical elements during the adjustment of the optical elements. In one embodiment, each of the front part 94 and the rear part 96 builds a separate closed cycle system. A port 96 for supply with heated air and a port 98 for transportation of the used air from the incubator chamber may be positioned respectively on the upper side surface and the lower side surface of each of the front part 94. Similarly, a port 100 for supply with heated air and a port 102 for transportation of the used air from the incubator chamber may be positioned respectively on the upper side surface and the lower side surface of each of the front part 96.

Before entering the incubator chamber the heated air may be filtered by a Microfilter(s) to remove dust particles.

The temperature control system (not shown) allows the establishing and maintenance of a constant temperature up to about 50° C. with a precision of about 0.1° C. Within the incubator chamber there is provided a temperature sensor. The temperature sensor may be positioned in the vicinity of the object space. The temperature value measured by the temperature sensor is compared to a set value and adjusted until the two values become equal. For the establishment of a constant temperature of e.g. 37° C. the whole system may be heated up for at least two hours. This includes the temperature adaptation of the optical components, the positioning units and the basic aluminium construction in order to avoid temperature gradients during the measurement which otherwise would effect the optical conditions and thus the detection signal. Optionally, a special software module, which may be implemented as a separate module of the overall software package, is employed to control the temperature control system. The temperature control system may be for example accessed via a serial interface. This facilitates the data acquisition over a long period of time at different temperatures.

Observation Chamber

The observation chambers for vertical SMI microscope in-vivo procedures can be designed for example with ordinary lateral (x-y) object slide dimensions and a height of 1.5 mm to increase the usable volume (up to ~200 μl) for (culture) medium.

Figure 9A:
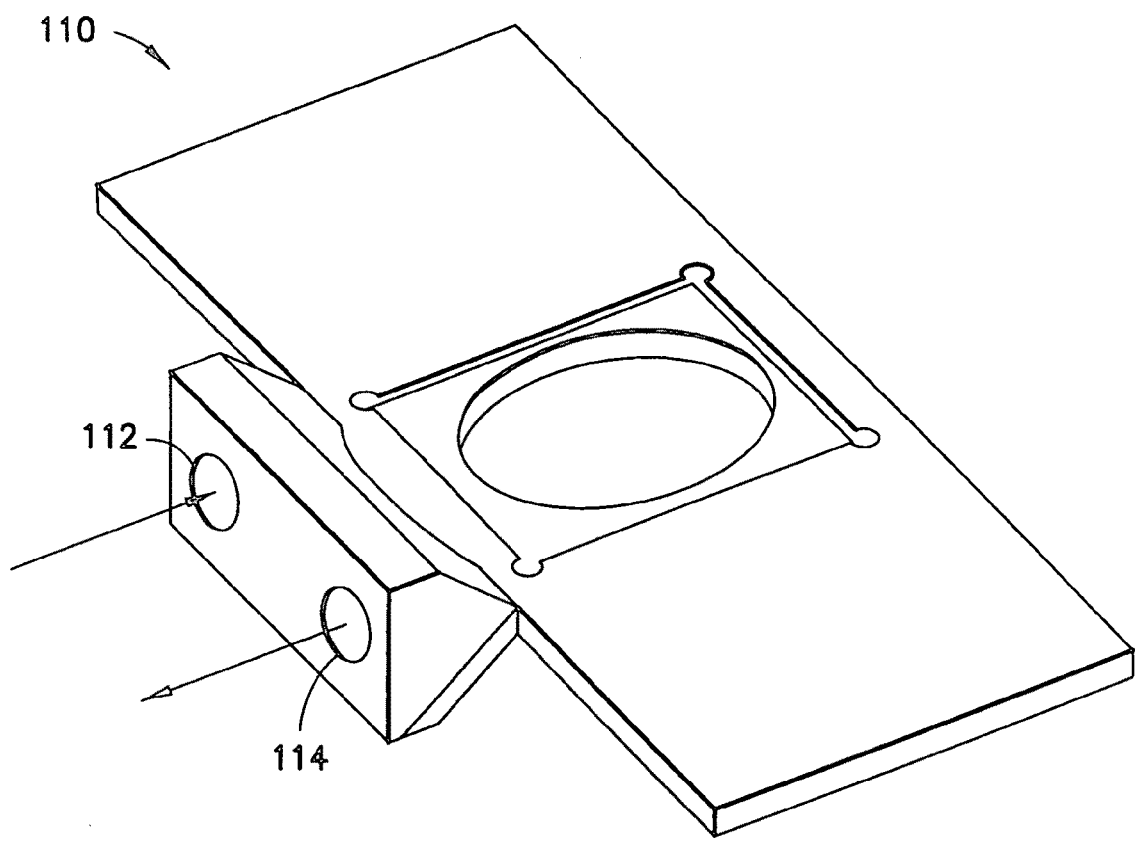
FIGS. 9a-c show examples of observation chambers.
Figure 9B:
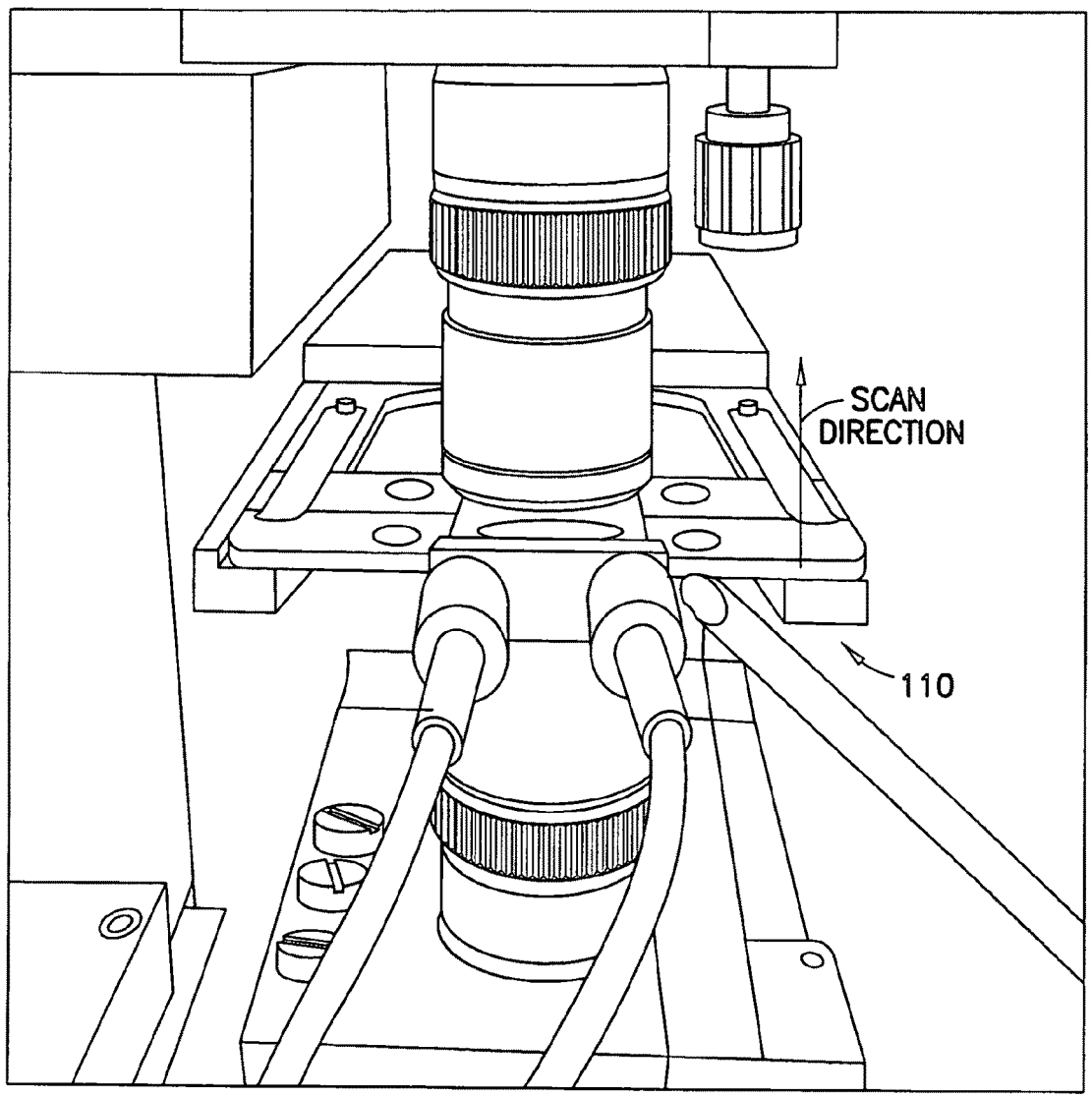
Figure 9C:
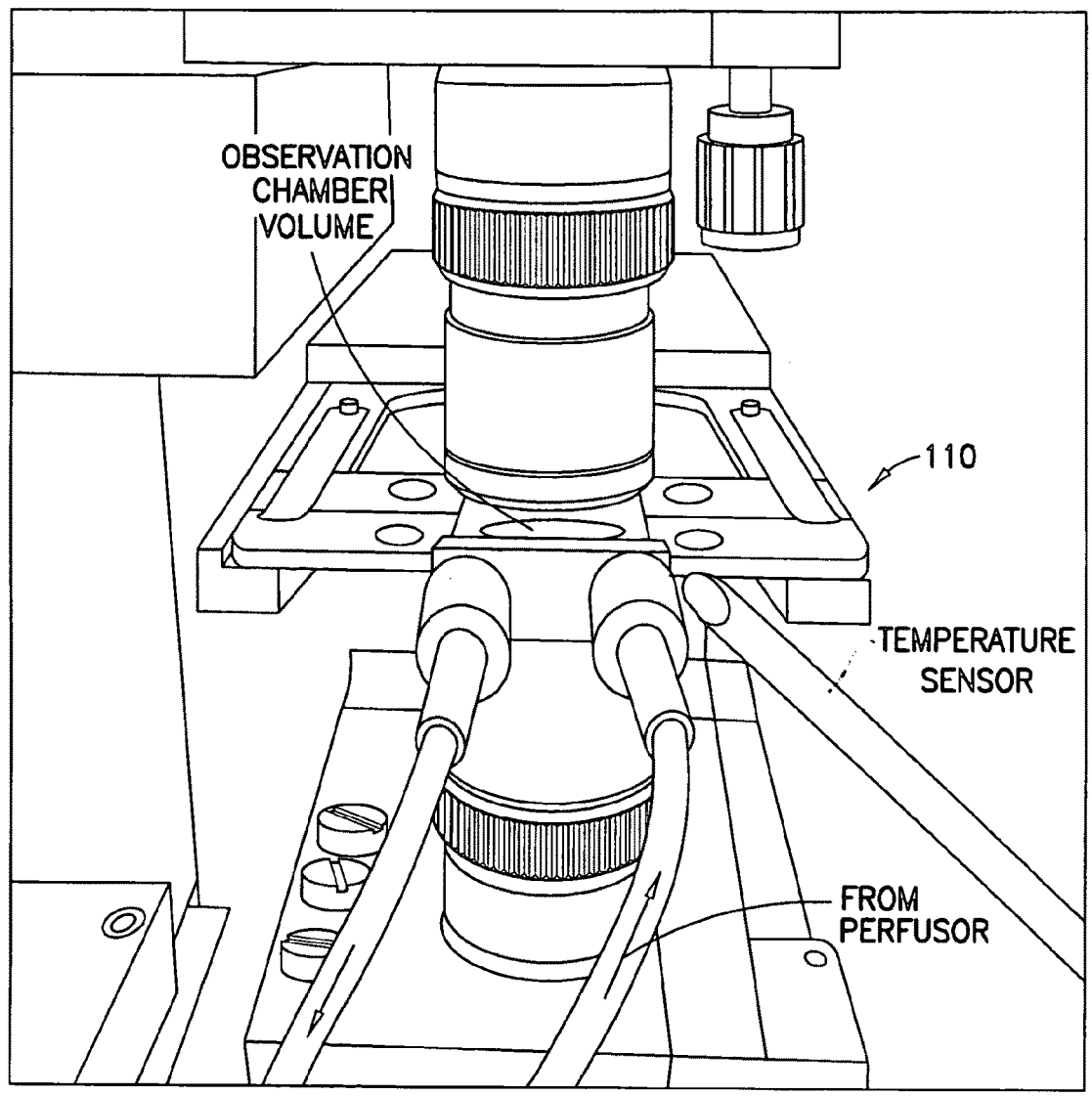

FIG. 9a shows an example of one observation chamber 110. FIGS. 9b and 9c show observation chambers 110 positioned in the object space between the two opposite objective lenses. Via two connectors for flow control systems (for example culture) coupled to respective connector ports 112 and 114 medium can be pumped in and out of the observation chamber to keep the specimens alive.

The outer dimensions of the device may be for example $76 \times 26 \times 1.5$ mm$^3$ (length×width×height). This allows an unproblematic positioning of the chamber in the standing wave field of the microscope. Via two connectors to flow-control systems, the observation chamber enables the in-vivo specimens to be supplied with nutrients and $CO_2$ and facilitates removing waste products. Furthermore this enables "real-time" measurements to be performed by pumping medium into the observation chamber during the measurement and observing the effects at the same time. In one embodiment mobility patterns (for example mobility patterns of subchromosomal compartments) are resolved very accurately in at least one dimension by leaving the observation chamber stationary in the focal plane of the detection objective lens instead of sampling it. Due to the structured illumination accurate mobility profiles are accessible when a mobile object is moving through the illumination pattern.

The observation chamber may be from aluminium or from a plastic which is resistant against high temperatures and acids. The observation chamber is sealable from the top and/or bottom with cover slips. The observation chamber may be sealable for example with ordinary $18 \times 18$ mm$^2$, $20 \times 20$ mm$^2$ or $22 \times 22$ mm$^2$ cover slips for three different models with an appropriately decreased/increased volume.

The observation volume itself may feature a circular geometry to guarantee an optimal in- and outflow of the medium. As flow-control unit a standard perfusor (for example from Braun, Melsungen, Germany) for clinical applications, with a fluid reservoir up to 50 ml may be used. The infusion speed can be regulated arbitrarily for example between 0.1 ml and 99 ml per hour.

The system properties and behaviour have been tested by performing a series of measurements using fluorescent microspheres of known size (beads) at standard conditions (i.e. at room temperature of 22° C.) and at different temperatures. The results shown below were evaluated using the data analysis tool described earlier, i.e. the automatic object identification and fitting procedures, thus providing reliability with the help of a standardised data evaluation procedure.

Measurements Performed Under Standard Conditions

Calibration runs were performed at room temperature using oil and water immersion objective lenses. For this, green and yellow fluorescent microspheres (for example from Duke Scientific Corporation, USA and Molecular Probes (Invitrogen), Germany) for both laser sources. The microspheres exhibiting diameters of 44 nm to 200 nm and a manufacturer given uncertainty of 5-15% were distributed homogeneously and prepared on conventional cover slips (thickness ~155-160 μm), mounted in embedding media (glycerol, refractive index n=1.440) and fixed on a standard object slide.

FIGS. 10 and 11 show the results of bead measurements with diameters of 44 nm, 71 nm, 88 nm, 100 nm, 140 nm and 200 nm (excitation at $\lambda_{exc}$=488 nm) and 63 nm, 100 nm and 200 nm (excitation at $\lambda_{exc}$=568 nm). These diameters are representative of the range in which the SMI can reliably evaluate object sizes. The evaluated object sizes with mean Standard Deviations (SD) are plotted against the nominal object sizes as given by the manufacturer for oil and water immersion objective lenses. For a better visualisation two lines are drawn which indicate a ±10 nm error interval.

Figure 10A:
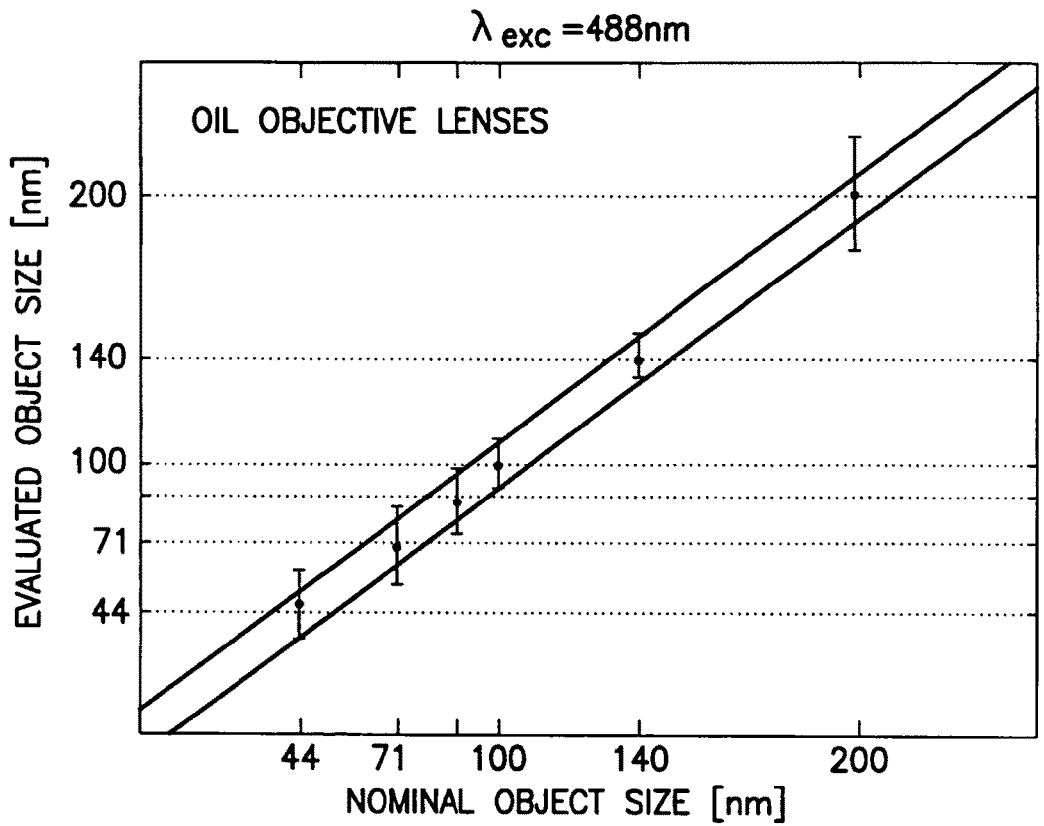
FIGS. 10a,b show results of bead measurements at excitation wavelength $\lambda_{exc}$=488 nm.
Figure 10B:
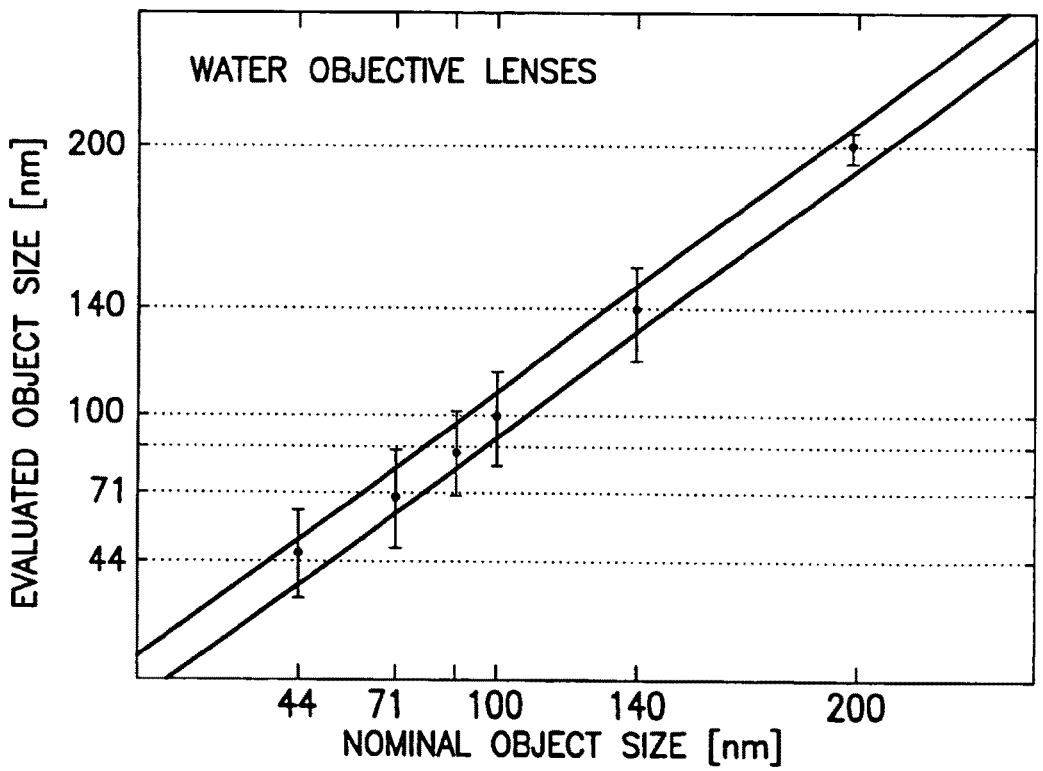

In particular, FIG. 10 shows the evaluated object sizes (ordinate), wherein mean and standard deviation are being indicated by bars, plotted against the nominal size (abscise) of 44-200 nm beads using an excitation wavelength $\lambda_{exc}$=488 nm for oil (FIG. 10a) and water (FIG. 10b) immersion objective lenses. The two lines indicate a ±10 nm error interval.

Figure 11A:
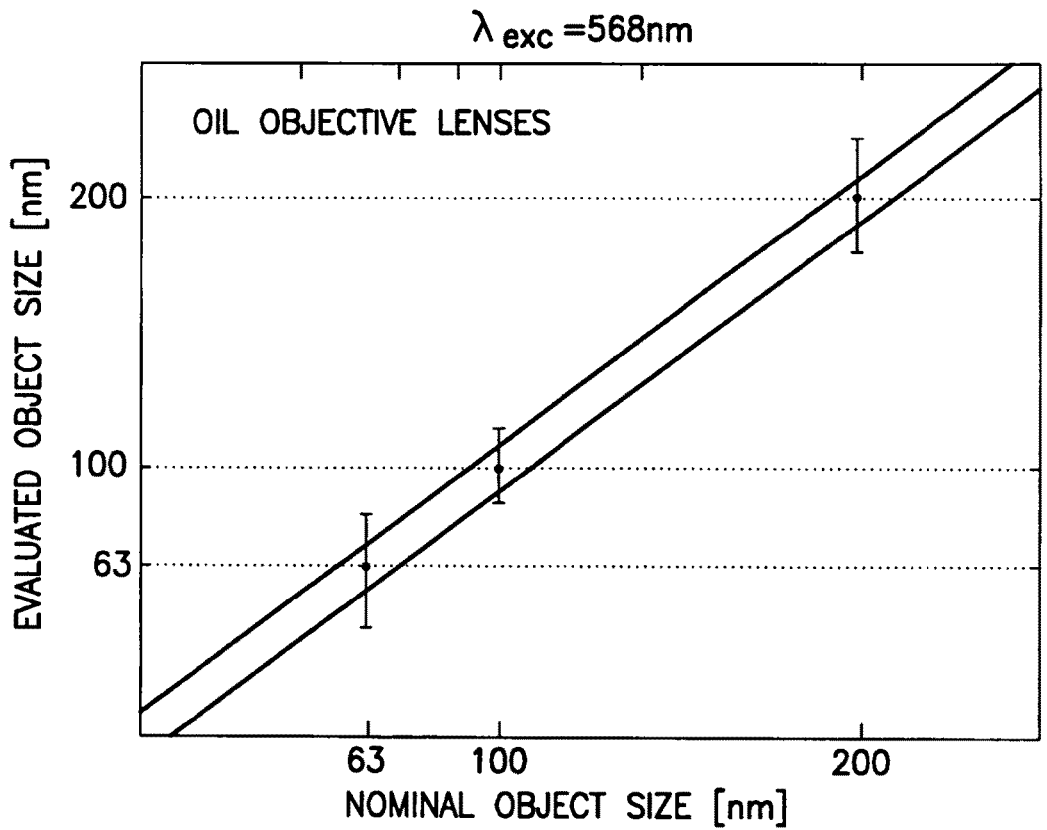
FIGS. 11a,b show results of bead measurements at excitation wavelength $\lambda_{exc}$=568 nm.
Figure 11B:
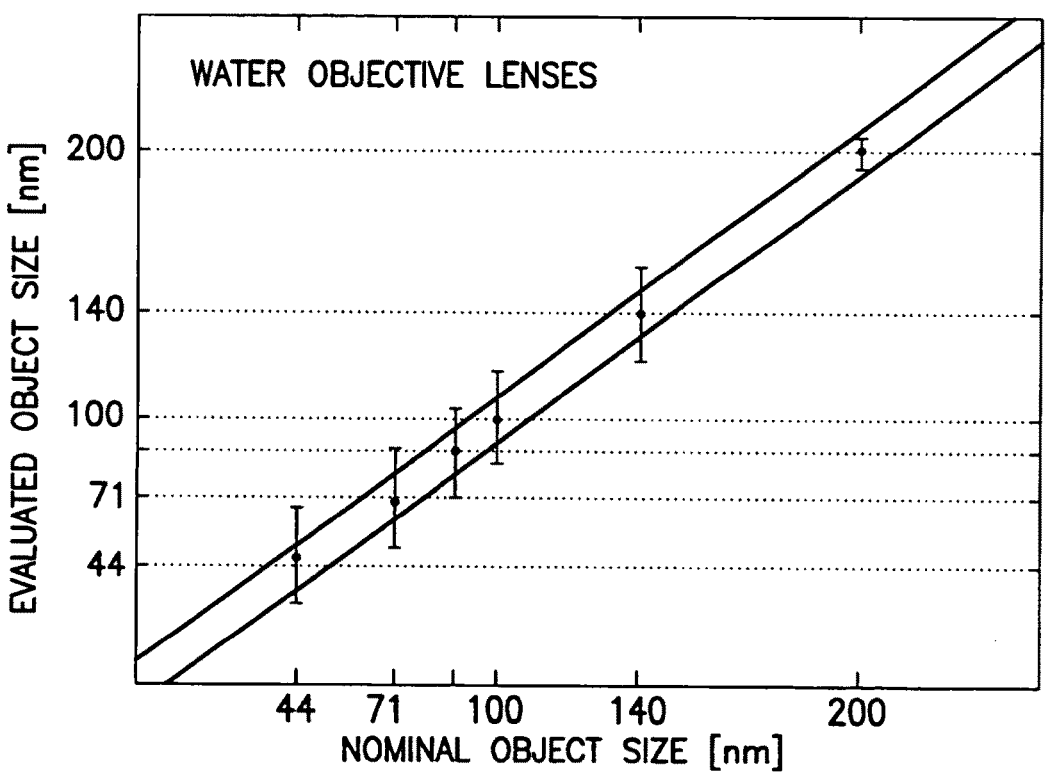

FIG. 11 shows the evaluated object sizes (ordinate), wherein the mean and standard deviation being indicated by bars, plotted against the nominal size (abscise) of 44-200 nm beads using an excitation wavelength $\lambda_{exc}$=568 nm for oil (FIG. 11a) and water (FIG. 11b) immersion objective lenses. The two lines indicate a ±10 nm error interval.

As the results show, the standard deviations for the objects acquired with water objective lenses are slightly larger compared to those obtained with oil objective lenses. This can be attributed to the worse sensitivity of the water objective lenses and to the water embedding of the specimens resulting in a lower signal-to-noise ratio. When using water immersion objective lenses the integration time was increased up to 500 ms even for very bright objects, i.e. beads with diameters 100 nm, in order to generate a reasonable amplitude ratio between the maximum of the inner/outer envelope of the intensity distribution and the background signal. This explains the slightly worse standard deviations for the measurements performed with water objective lenses due to the worse SNR which is a result of the low photon statistics in combination with a thus distinct background. As a result the modulation behaviour and the accuracy of parameter (size) determination by the fit function respectively is not as good as in the case when oil objective lenses are used. Furthermore, except for the evaluated object sizes of 200 nm beads, the SMI sensitive range for object size evaluation slightly depends on the refractive index, i.e. that this interval is switched marginally upwards and thus to larger object sizes for smaller refractive indices. As a consequence the discriminated SD of 200 nm beads measured with water objective lenses was smaller. Optionally a correction of this effect may be implemented.

In order to improve the system properties towards live cell imaging a rapid data acquisition is employed to minimize the effects of object movement on the axial intensity distribution (AID). Assuming a reasonable fluorescence signal, resulting in an appropriate SNR, in one embodiment the time for acquiring a complete 3D SMI data stack is reduced down to 1.8 seconds (~15 frames/s).

Measurements Performed Under the Influence of Heat

For the improvement of long term in-vivo measurements, the system properties (including both the hardware such as the piezo electrical stage and the optical components) were tested using different arrangements at different temperature levels to guarantee the stability of the interferometer and the object sampling procedure.

To simplify the interpretation of the results, three bead sizes with diameters lying in the central region of the SMI sensitive range for size determination were used. The application of very small and/or very largely sized beads provides even under standard conditions a broader distribution. In this case it would be more difficult to decide, whether an abnormality is caused by temperature effects or only due to the higher uncertainties when evaluating small and large object sizes respectively.

Figure 12A:
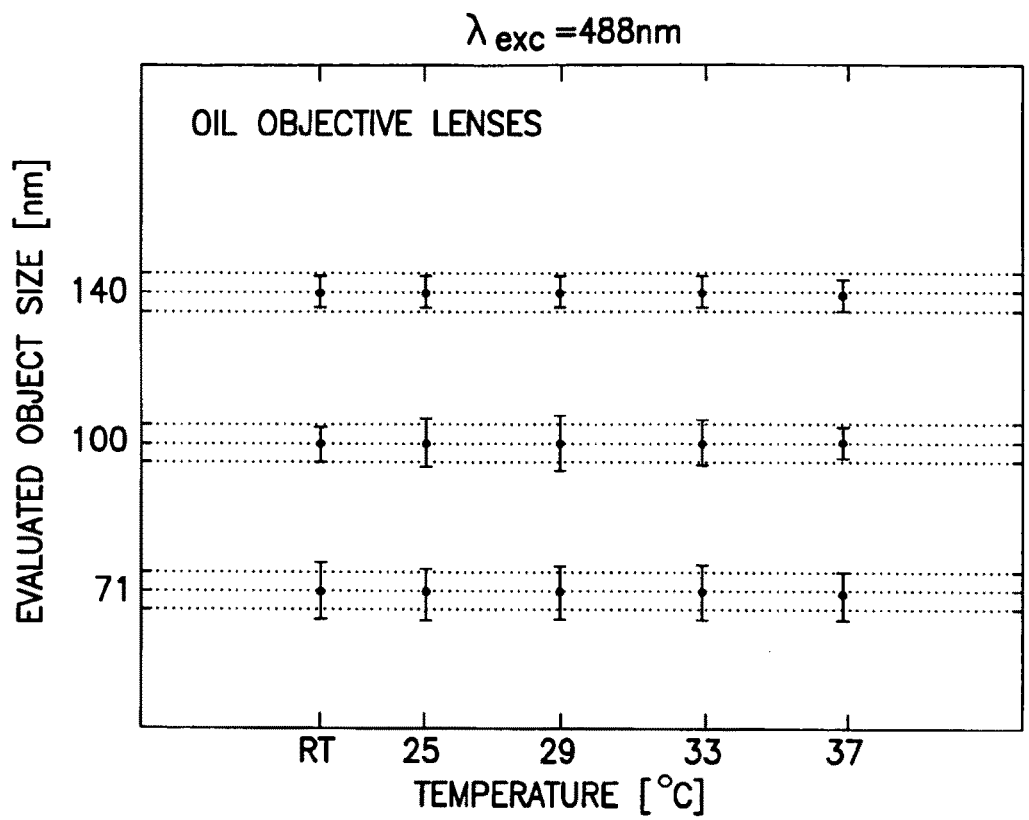
FIGS. 12a,b show results of bead measurements at different temperatures.
Figure 12B:
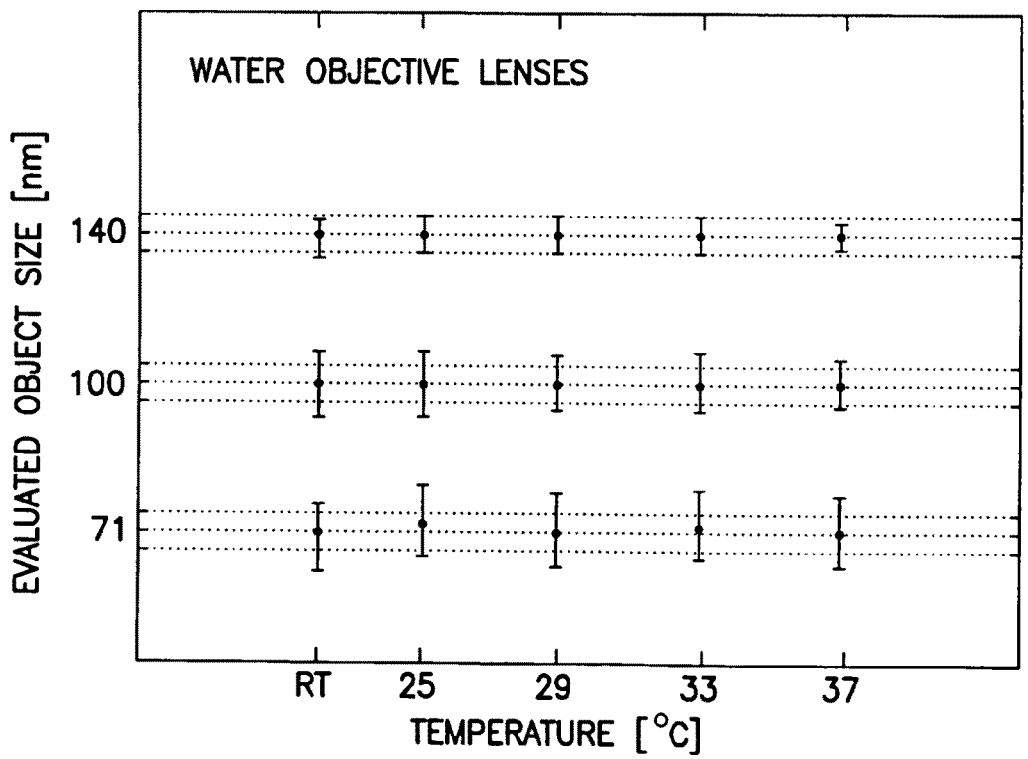

FIG. 12 shows the evaluated object sizes, wherein the mean and standard deviations are indicated by bars, with data acquired at different temperatures in [° C.] (abscise) using oil (FIG. 12a) and water immersion (FIG. 12b) objective lenses at an excitation wavelength of $\lambda_{exc}$=488 nm. For room temperature (RT) and for temperature 25/29/33/37° C. beads with diameters of 71 nm, 100 nm and 140 nm were evaluated. For comparison a ±10 nm error interval is indicated by the two lines for each bead size (respectively diameter) by two dashed lines.

After changing the temperature level, the microscope was left to rest for at least two hours before the sampling procedure was started, thus allowing the microscope system to adapt to the respective environmental conditions. Hence the last data stack at 37° C. was acquired after an overall time of about twelve hours. No significant differences in evaluated object sizes at higher temperature levels are found as compared to the results at room temperature. For example when looking at the 100 nm beads measurements with the water immersion objective lenses, the discriminated value of 100±12 nm (597 objects were analysed) at 37° C. shows a smaller SD than at room temperature (99±17 nm, 1443 objects were analysed), indicating that (the marginal) differences in mean values and SD's are not a result of environmental conditions.

The experimental results confirm that under the condition that an adequate thermal equilibrium between the environment, the basic microscope setup, the individual optical components and the sample positioning units is established, no additional uncertainty in size measurements caused by thermal effects exists. In this case, no further parameters during live cell measurements and analysis respectively have to be regarded. Consequently, the number of additional degrees of freedoms during in-vivo procedures is only a result of effects caused by object mobility.

Live Cell Measurements

Several measurements of living biological specimens were performed using the vertical SMI microscope. Human Osteosarcoma (U2OS) cells with tet-operator repeats stably integrated into interphase chromatin were used for different experimental arrangements. It was thus possible to 1) test the basic behaviour of the vertical SMI microscope including signal extraction of subnuclear complexes underlying dynamical processes as first preliminary in-vivo analysis and 2) to analyse the effects of ordinary fixation procedures on a subnuclear level. The results for 2) were evaluated by performing a "real-time" observation of the fixation process via pumping fixation medium (paraformaldehyde (PFA)) into the observation chamber and observing this process for the specific target regions continuously until the fixation procedure was completed (our unpublished data).

The tet-system is a well chacterised system for which basic information in terms of extension and mobility patterns of the individual loci were well known a priori. The tet-inserts were labelled with tet-repressor GFP and the cells were grown on a standard cover slip. This cover slip was then fixed to the observation chamber with nail polish. A second cover slip was fixed at the reverse side before in order to fully close the chamber except of the two connectors for flow-control. Cell damage was avoided by pumping Hepes culture medium into the observation volume. Subsequently the observation chamber was positioned accurately in the object space between the two opposite objective lenses.

For the results shown here an excitation wavelength of $\lambda_{exc}=488$ nm was used and the incubator chamber of the vertical SMI microscope was operated at T=37° C. during the overall observation procedure and data acquisition process. The observation chamber was covered with 18×18 mm^2 cover slips and culture medium was pumped with a flow rate of ~30ml/h into the chamber via the perfusor unit as described previously.

The signal-to-noise ration (SNR) of most of the loci was good enough to reduce data acquisition times down to two seconds per 3D SMI data stack. As a consequence it was possible, to extract very symmetrical intensity profiles with a distinct modulation behaviour.

Figure 13A:
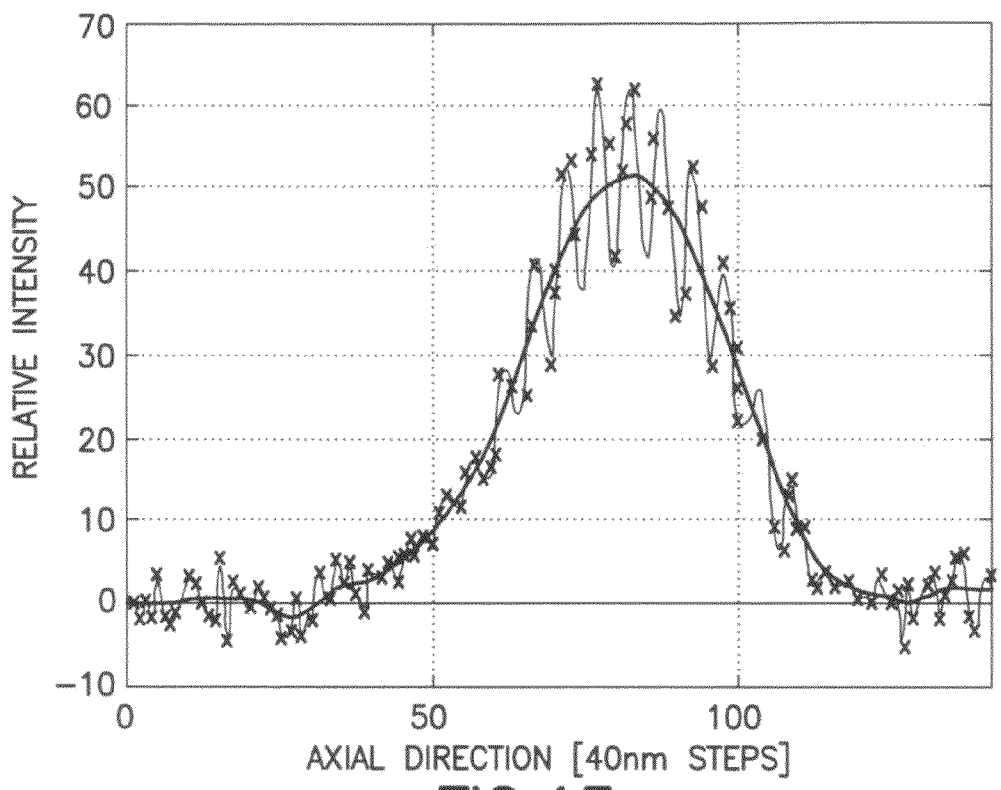
FIGS. 13a,b show results of live cell conditions measurements of a tet-operator loci in a U2OS cell.
Figure 13B:
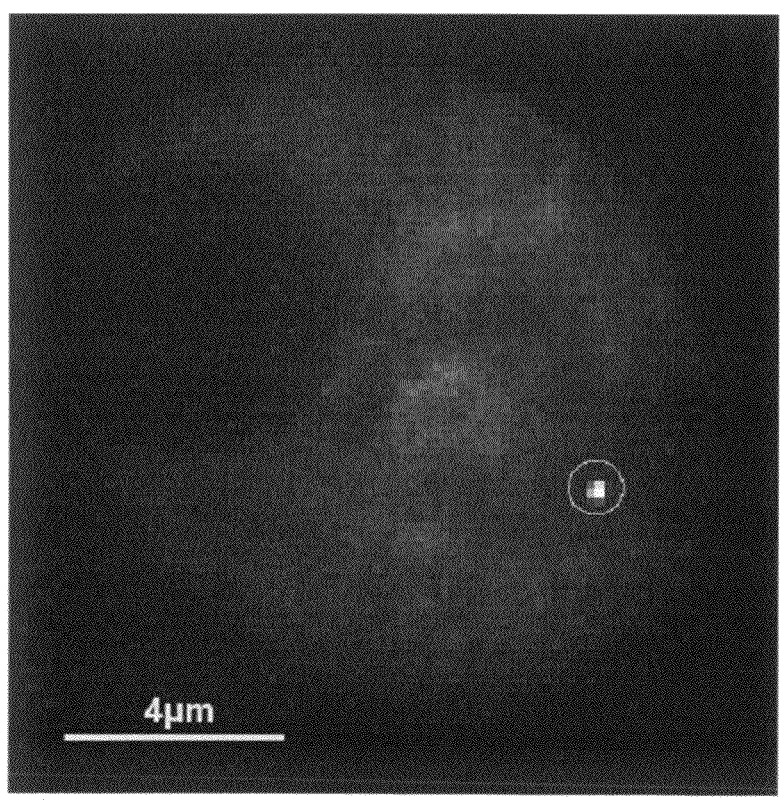

FIGS. 13a,b show an example of the in-vivo signature (axial intensity distribution or AID) of a tet-operator loci in a U2OS cell with the corresponding raw data (maximum intensity projection) acquired under live cell conditions. In particular, FIG. 13a shows the in-vivo signature of a tet-repressor GFP loci measured under live cell conditions. The corresponding raw data is shown in FIG. 13b. The axial intensity distribution (AID) shows a very symmetrical profile and a clear modulation behaviour thus demonstrating the in-vivor applicability of the Vertico SMI.

Figure 14:
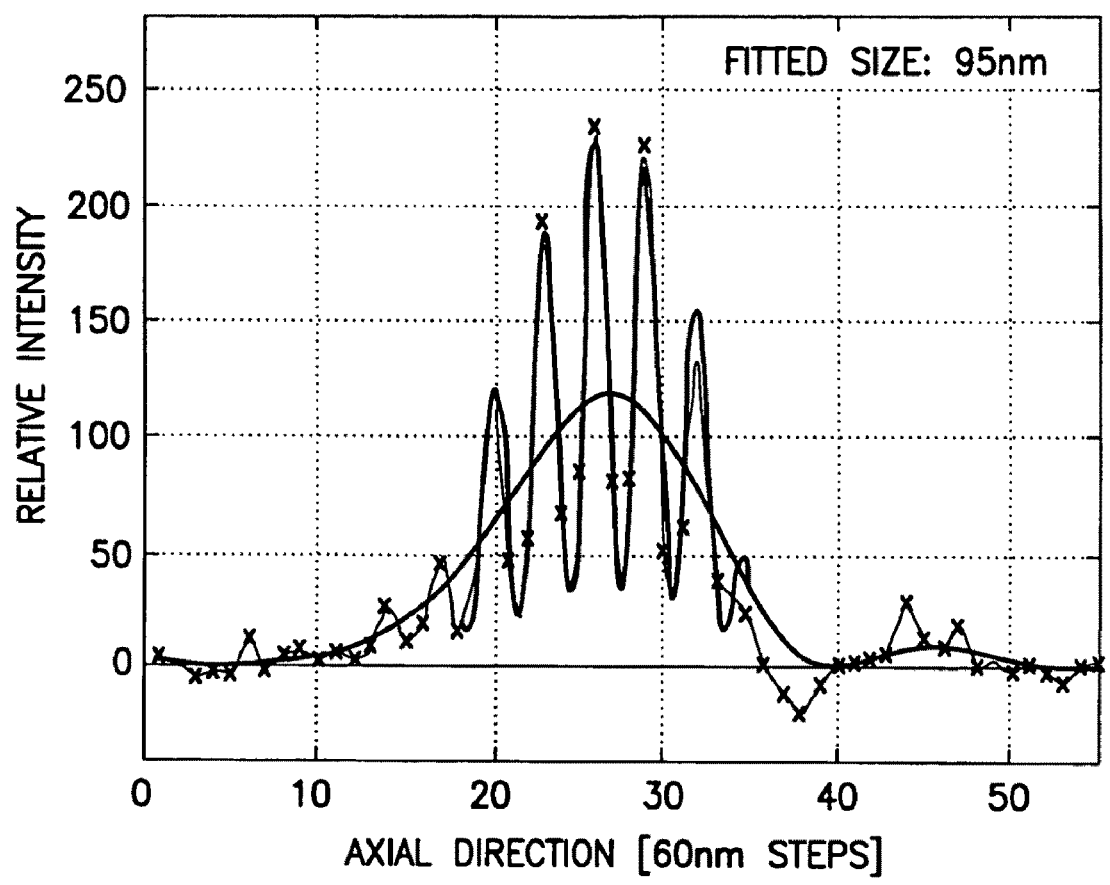
FIG. 14 shows the result of measurement of 100 nm calibration object with a vertical SMI microscope.

FIG. 14 shows the axial intensity distribution obtained by a measurement of 100 nm calibration object (a microsphere of size 100 nm) with a vertical SMI microscope. The respective three dimensional SMI data set was obtained in 1.8 seconds.

Figure 15:
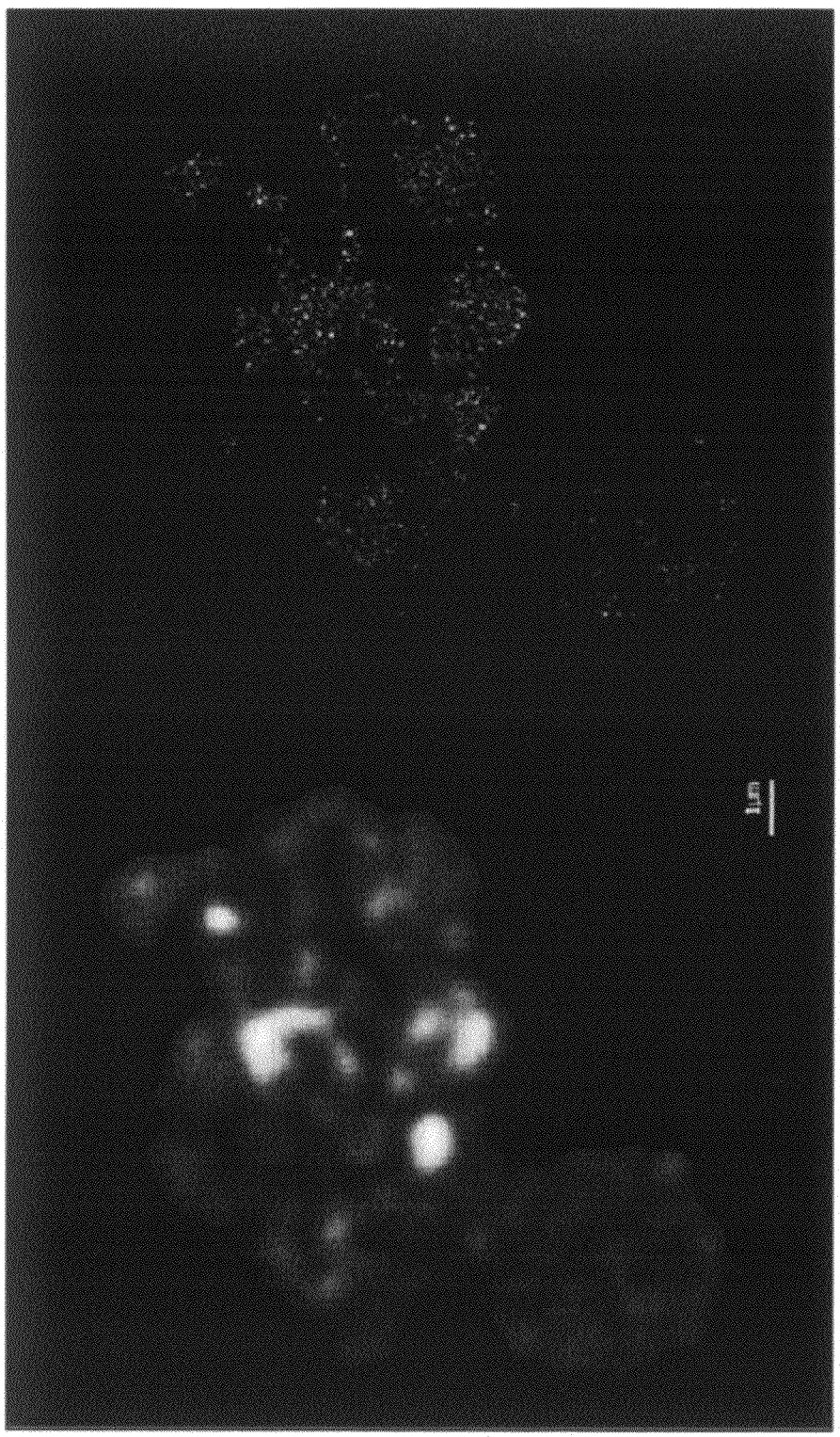
FIG. 15 shows a comparison between a conventional Epifluorescent image and an Image obtained by a vertical SMI microscope.

FIG. 15 shows a comparison between a conventional Epi-fluorescent image with N.A.=1.4 (left) and an image obtained by a vertical SMI microscope (right) of plant cells with fluorescent proteins.

Figure 16:
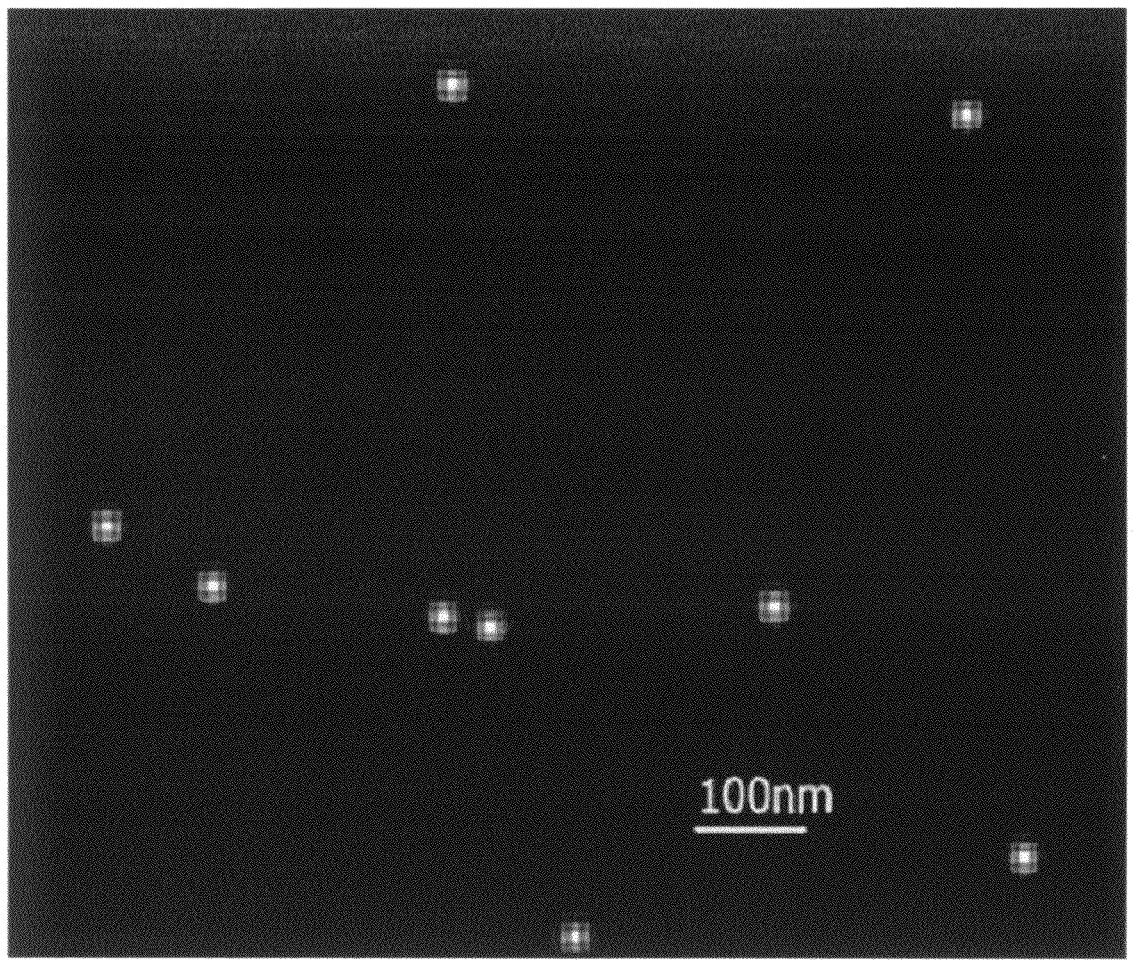
FIG. 16 shows a detail of the image of a plant cells with fluorescent proteins obtained by a vertical SMI microscope.

FIG. 16 shows a detail of the image of a plant cells with fluorescent proteins obtained by a vertical SMI microscope. The wavelength of the excitation light is $\lambda_{exc}=488$ nm, the localization accuracy is equal to the pixel size and to the effective optical resolution of about 10 nm.

To summarise, the above results demonstrate that if the living object is small, i.e. with dimension inside the SMI sensitive range for size evaluation, and not moving too rapidly in combination with a good SNR, leading to very high DAQ rates, a clear modulation behaviour can be observed. With such data at least qualitative statements about the structural characteristics of living subnuclear complexes can be given for objects on a subnuclear level.

There are several criteria to assess the applicability of a microscopic system for in-vivo measurements, in particular for in-vivo measurements of living cells. A first criterion is the capability of the system to measure very small objects. With the system according to an embodiments of the present invention beads with nominal diameters of 44 nm, have been successfully measured.

The second criterion concerns data acquisition during in-vivo procedures. The system according to an embodiment of the invention enables a very precise object sampling and very high data acquisition rates. Thus for example, the time for acquiring a complete 3D SMI data stack can be reduced down to presently 1.8 s under the assumption of a reasonable Signal-to-noise Ratio (SNR). This is important concerning size determination with respect to object mobility in order to minimise disturbing effects on the object's Axial Intensity Distribution (AID).

With the microscopical systems and methods according to an aspect of the invention, it is possible to perform measurements and analysis of living biological specimens, for example extract meaningful axial intensity distributions of the regarded loci under in-vivo conditions. With this first preliminary information a more detailed analysis of intra-nuclear motion and the effects of standard fixation procedures at the overall genome structure on a subnuclear level may be carried out. The above system and methods may be also utilised for resolving mobility patterns of subchromosomal compartments very accurately (at least in one dimension) by leaving the observation chamber stationary in the focal plane of the detection objective lens instead of sampling it. Due to the structured illumination accurate mobility profiles are accessible when a mobile object is moving through the illumination pattern.

In addition to size measurements of subnuclear complexes in the range down to a few tens of nanometers, SMI microscopy respectively SMI microscopical systems and methods according to an aspect of the invention may furthermore offer interesting perspectives in localisation microscopy approaches to increase topological and effective optical resolution.

The methods for analysing microscopic images and the respective microscopic systems according to the above aspects of the invention can be combined with SPDM methods.

Spectral Precision Distance Microscopy/Spectral Position Determination Microscopy (SPDM) is a far-field light microscopy approach based on labelling of neighbouring "point like" objects with different spectral signatures ("colours"), spectrally selective registration and high precision position monitoring, i.e. a method of "Spectrally Assigned" Localization Microscopy (SALM). This method allows the labelling of objects with any spectral signature, provided that in a given observation volume a discrimination of the objects due to their spectral signature is achieved. Combined with careful calibration of chromatic aberrations and cross talk, this allows the measurement of positions and mutual distances between the "point-like" fluorescent objects in a range far below the "Abbe-Limit" of distance resolution in terms of the "Sparrow-Limit" for objects of the same spectral signature. Examples for the application of SPDM in nuclear genome structure research are the analysis of the BCR-ABL region correlated with chronic myeloic leukaemia; of conformational differences in the 3D-nanostructure of the immunoglobulin heavy-chain locus, a hotspot of chromosomal translocations in B lymphocytes; or of the distribution of genes in the active and inactive X-chromosome territory.

SPDM can also be applied to measure localisations of single molecules and the distance between them in a range >10 nm, i.e. in a range too large for FRET techniques but considerably below the optical resolution of conventional, confocal, or 4Pi microscopy. It requires, however, that in a given observation volume (defined e.g. by the Full Width at Half Maxima (FWHM) of the Point Spread Function (PSF) of the microscope system used), there is just one object with a given spectral signature to be measured at a given time. Since the reasonable number of useful different spectral signatures is still limited (presently at about 7), this means that e.g. membrane rafts with adjacent proteins of the same type cannot be resolved.

The methods for analysing microscopic images and the respective microscopic systems according to the above aspects of the invention can be also combined with PALM/FPALM or related methods.

A Photoactivated Localization Microscopy/Fluorescence Photoactivated Localization Microscopy (PALM/FPALM) is a further development of localization microscopy with different spectral signatures. It allows a further improvement of the (macromolecular) effective optical resolution. A combination with methods similar to PALM/FPALM, such as STORM (i.e. "sub diffraction limit imaging by Stochastic Optical Reconstruction Microscopy") and PALMIRA ("PALM with independently running acquisition") is also possible. As in SPDM, these approaches are based on very precise (nanometer) positioning of subwavelength sized objects, in this case single molecules, detecting just one object of a given spectral signature in the observation volume. Whereas SPDM generally uses objects of different photostable spectral signature to resolve them spatially within the observation volume given by the microscope used, (F)PALM/STORM/PALMIRA allow an effective optical resolution of presently down to 10 nm-20 nm even in the case that all objects are labelled with the same type of fluorochrome. This is possible by using photoconvertable fluorochromes instead of photostable ones.

While such SALM (Spectrally Assigned Localisation Microscopy) methods have been applied successfully to single fluorochrome molecules in the object plane (x-y), the approach to realise an effective macromolecular optical resolution in 3D is still missing. Using the methods and microscopical systems according to an embodiment of the present invention, single molecules (for example single fluorochrome molecules) may be localized in 3D with nanometer precision.

Figure 17:
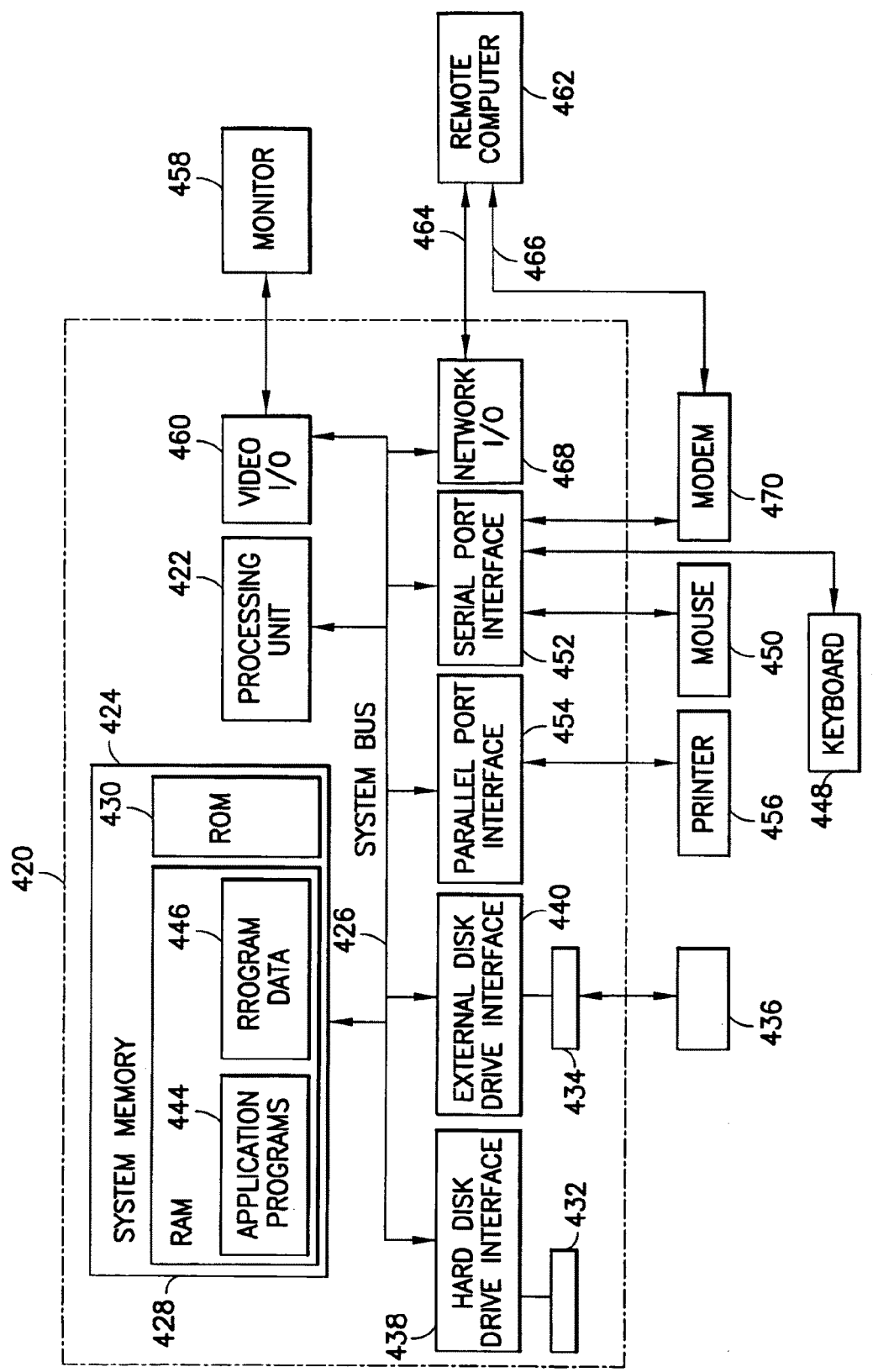
FIG. 17 shows an example of a computer system.

FIG. 17 shows an example of a computing system and respectively a computing unit for carrying out the methods for analysing microscopic images according to the above aspects of the invention according to an embodiment of the present invention.

With reference to FIG. 17, an exemplary system for implementing the methods for analysing microscopic images includes a general purpose computing device in the form of a conventional computing environment 420 (e.g. personal computer) including at least one processing unit 422. The at least one processing unit 422 may have at least dual core capabilities, so that at least two processes can run simultaneously. The system includes further a system memory 424, and a system bus 426, that couples various system components including the system memory 424 to the processing unit 422. The processing unit 422 may perform arithmetic, logic and/or control operations by accessing system memory 424. The system memory 424 may store information and/or instructions for use in combination with processing unit 422. The system memory 424 may include volatile and non-volatile memory, such as random access memory (RAM) 428 and read only memory (ROM) 430. A basic input/output system (BIOS) containing the basic routines that helps to transfer information between elements within the personal computer 420, such as during start-up, may be stored in ROM 430. The system bus 426 may be any of several types of bus structures including a memory bus or memory controller, a peripheral bus, and a local bus using any of a variety of bus architectures.

The personal computer 420 may further include a hard disk drive 432 for reading from and writing to a hard disk (not shown), and an external disk drive 434 for reading from or writing to a removable disk 436. The removable disk may be a magnetic disk for a magnetic disk driver or an optical disk such as a CD ROM for an optical disk drive. The hard disk drive 434 and external disk drive 434 are connected to the system bus 426 by a hard disk drive interface 438 and an external disk drive interface 440, respectively. The drives and their associated computer-readable media provide nonvolatile storage (as an example of a storage unit) of computer readable instructions, data structures, program modules and other data for the personal computer 420. The data structures may include the detected microscopic images. The data structures may include relevant data of the implementation of the methods for processing microscopical images, as described in greater detail above. The relevant data may be organized in a database, for example a relational or object database.

The program modules may include program modules implementing the methods for processing of microscopic images for object detection and/or the methods for processing of microscopic images comprising the step of fitting mathematical fit function to the obtained data, as described in greater detail above. The program modules may further include other relevant control modules.

Although the exemplary environment described herein employs a hard disk (not shown) and an external disk (not shown), it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk 432, external disk, ROM 430 or RAM 428, including an operating system (not shown), one or more application programs 444, other program modules (not shown), and program data 446. The application programs may include at least a part of the functionality as detailed in FIGS. 1 to 16.

A user may enter commands and information, as discussed below, into the personal computer 420 through input devices such as keyboard 448 and mouse 450. Other input devices (not shown) may include a microphone (or other sensors), joystick, game pad, scanner, or the like. These and other input devices may be connected to the processing unit 422 through a serial port interface 452 that is coupled to the system bus 426, or may be collected by other interfaces, such as a parallel port interface 454, game port or a universal serial bus (USB). Further, information may be printed using printer 456. The printer 456, and other parallel input/output devices may be connected to the processing unit 422 through parallel port interface 454. A monitor 458 or other type of display device is also connected to the system bus 426 via an interface, such as a video input/output 460. In addition to the monitor, computing environment 420 may include other peripheral output devices (not shown), such as speakers or other audible output.

The computing environment 420 may communicate with other electronic devices such as a computer, telephone (wired or wireless), personal digital assistant, television, or the like. To communicate, the computer environment 420 may operate in a networked environment using connections to one or more electronic devices. FIG. 17 depicts the computer environment networked with a remote computer 462. The remote computer 462 may be another computing environment such as a server, a router, a network PC, a peer device or other common network node, and may include many or all of the elements described above relative to the computing environment 420. The logical connections depicted in FIG. 17 include a local area network (LAN) 464 and a wide area network (WAN) 466. Such networking environments are commonplace in offices, enterprise-wide computer networks, intranets and the Internet.

When used in a LAN networking environment, the computing environment 420 may be connected to the LAN 464 through a network I/O 468. When used in a WAN networking environment, the computing environment 420 may include a modem 470 or other means for establishing communications over the WAN 466. The modem 470, which may be internal or external to computing environment 420, is connected to the system bus 426 via the serial port interface 452. In a networked environment, program modules depicted relative to the computing environment 420, or portions thereof, may be stored in a remote memory storage device resident on or accessible to remote computer 462. Furthermore other data relevant to the application of the methods for processing of microscopical images (described above) may be resident on or accessible via the remote computer 462. The data may be stored for example in an object or a relation database. It will be appreciated that the network connections shown are exemplary and other means of establishing a communications link between the electronic devices may be used.

The above-described computing system is only one example of the type of computing system or a computing unit that may be used to implement the steps of the method for processing of microscopic images according to an aspect of the present invention.

In summary according to one aspect of the intention there is provided a computer implemented method for processing of microscopic images to detect objects of interest comprising:

subjecting the microscopic image to a bandpass filtering to obtain a filtered image, wherein the bandpass filtering is such as to suppress the noise and any objects which are larger than a predetermined size;

processing the filtered image at a plurality of progressively decreasing threshold levels, said processing comprising:

at each threshold level detecting the objects of interest using an object labelling algorithm; and removing the detected objects detected at a given threshold level from the working image before proceeding to the next threshold level.

The bandpass filter may be implemented as two successive filters, wherein in the first step a low pass filter is applied, and in a second step a high pass filter is applied. In another example the bandpass filter may be applied directly as such.

The low pass filter may be implemented for example as a convolution with a Gaussian smoothing kernel to obtain a smoothed image. Various other implementations of the low pass filter are, however, equally possible. In one example the low pass filter has $\sigma \approx 1$ pixel, wherein $\sigma$ denotes the standard deviation.

The high pass filter may be implemented as a convolution of a copy of the original image with a broader Gaussian filter, for example a Gaussian filter with a width $\approx 2$ the width of the point spread function and subtracting the blurred copy from the smoothed image. In one example the high pass filter has $\sigma \approx 3$ pixel, wherein $\sigma$ denotes the standard deviation. Such filtering provides a good rejection with large scale objects, which are not interesting for further analysis.

By employing a bandpass filtering as set above, the resulting filtered image is free from both noise and of larger objects or background. The restriction of the signal to a band of frequencies proves to be very effective in selecting point-line structures. In contrast to several forms of optimal filtering, knowledge of which objects are uninteresting for a subsequent analysis is also included. This is an advantage over filtering methods for point-like objects, which employ correlation of the image with a copy of the point spread function, without taking into account the size of the objects of interest. Such filtering methods have been proven not to provide a good rejection of large scale features, which are of no interest for further analysis.

At each threshold level the objects may be detected using for example a standard labelling algorithm.

By further processing the image at a plurality of progressively decreasing thresholds with the objects found at each threshold being removed from the image before processing to the next threshold, the bright objects will disappear from the working image upon detection, thus facilitating the detection of weaker objects in the subsequent steps, i.e. at the subsequent thresholds.

The method for processing of microscopic images to detect object of interest may be applied to various microscopic images, in particular two dimensional microscopic images, such as for example Confocal laser scanning microscopy (CLSM), Structured Illumination Microscopy (SIM), 4Pi and other microscopical images, in particular microscopical images obtained my detecting fluorescent light emitted from a fluorescently marked sample when excited by illumination light. The algorithm is in particularly suitable for identifying small point-like objects of interest in a microscopic image, in particular objects with size smaller that the optical resolution limit of the microscopic system with which the microscopic images are obtained. The brightness of the obtained image is generally proportional to the intensity of the detected fluorescent light. The sample may be marked by employing fluorescence-in-situ-hybridization (FISH) methods, for example COMBO-FISH, FAST-FISH, etc. methods.

The removing of the objects detected at each threshold level may comprise:

obtaining an estimate of the form the detected images would have taken in the image by applying a weighting to the masked image and convolving it with an approximation of the point spread function of the microscope;

subtracting the estimate from the working image.

The above procedure is repeated for the next lower threshold level.

The masked image is the image multiplied by a binary mask corresponding to the thresholded image. The labelling, per se, occurs independently of the masking.

The following exemplary pseudo-code illustrates the method:

```
thresholdedImage = image > threshold    //thresholdedImage will be binary
maskedImage = image*thresholdedImage         //will be 0 for
pixels lower than threshold, otherwise value of pixels in image
labeledImage = label(thresholdedImage)         //labelling occurs
independantly, and operates on the thresholded image
// ..... object removal steps ....
```

The above steps are repeated at each threshold.

In one example the image is blurred with a Gaussian approximation of the point spread function. The weighting may be any suitable weighting, such as weighting obtained based on empirical data.

The upper threshold level of the threshold range over which the processing of the filtered image is applied may be set to a half the maximum intensity in the filtered image. The lower threshold level of the threshold range over which the processing of the filtered image is applied may be estimated by multiplying the intensity corresponding to the maximum of the intensity histogram of the filtered image with a user defined factor.

The user defined factor allows the accommodation or adaptation of various different signal-to noise ratios background situations. The value of this factor may remain constant over different samples with the same type of labelling and similar acquisition parameters.

The user defined factor may be for example in the range 0.5-2, depending on object type and signal to noise ratio S/N.

The remaining threshold levels may be distributed logarithmically between the upper and lower threshold level.

Empirical studies show that this would result in approximately similar number of objects being detected at each step. The number of thresholds may vary depending on the implementation. For example 10 different threshold levels may be employed.

The method may further comprise:
recording the threshold level at which the object is detected along with the position of the detected object;
adjusting the threshold level a-posteriori by discarding all those points detected at and below a threshold value, at which a predetermined proportion of objects are not being analysed with a predetermined measure of goodness.

Although the above described method provides good results of detecting or identifying objects over a range of similar images using one lower threshold factor, there are cases when this proves difficult. If the threshold level at which each object is identified or detected is recorded along with the position of the identified or detected object, it is for example possible to deliberately set the lower threshold of the threshold range over which the processing of the filtered image is applied too low. Some noise will thus be incorrectly identified as objects. By analysing the dependence of the quality of the object identification or detection on the threshold, the threshold level may be set a-posteriory by discarding all those objects, which are detected at or below a threshold where a predetermined, significant proportion of objects were not detected with a predetermined measure of goodness. In one implementation this may be done for example by taking all points which had successfully been identified or detected above a threshold level where 95% of all points which would have been correctly identified or detected if the whole of the original threshold range was taken, have been detected.

The measure of goodness is not applied to the object detection as such, but rather to the results of the subsequent analysis. If it were possible to determine the 'goodness' of detection, it should be possible to determine a suitable threshold as part of the thresholding algorithm. However, there arises a problem that it is difficult to find suitable criteria which can predict whether a detected object is likely to be able to be analysed/fitted. The a-posteori thresholding defers this selection to after the analysis. Thus, it can be determined a-posteori how well the analysis worked on the various objects and select the suitable threshold level accordingly.

According to another aspect of the invention there is provided a computer implemented method for processing a stack comprising a plurality of two dimensional microscopic images of a fluorescently marked sample obtained by illuminating the sample with a structured illumination light and detecting the fluorescent light emitted from the sample, wherein each of said two dimensional microscopic images is an image of a plane, which is perpendicular to a predetermined axial direction, each of said two dimensional microscopic images being an image of a different plane along the axial direction,
said method comprising:
for a given object in the stack of microscopic images, determining the axial intensity distribution of the fluorescent light along the axial direction; and
fitting a mathematical model function I(z) of the form:

$$I(z) = A \times \mathrm{Env}(z) \times F(z)$$

to the obtained axial intensity distribution, wherein:
z is the predetermined axial direction;
A is a scaling factor;
Env(z) is an empirical envelope of the intensity distribution obtained by subjecting the intensity distribution to a low pass filtering, such as to remove the additional frequencies introduced through the structured illumination pattern; and F(z) is a function fitted to the component of the intensity distribution in the axial direction due to the structured illumination light.

The above method is in particular suitable to process a stack comprising a plurality of two dimensional microscopic images, to detect or locate objects of interest with size smaller that the optical resolution limit of the microscopic system with which the microscopic images are obtained.

One difference from the previous fit algorithms was to recognise that the fit function may be represented as a multiplication of two terms, wherein the interesting position and size information is contained entirely in the second, modulation term F(x) and wherein the first term (the fringe envelope Env(z)) can be determined from the obtained data beforehand and thus be removed from the fit itself. The empirical envelope Env(z) may be obtained by applying a low pass filter to the data along the z axis to remove the extra frequencies introduces through the illumination structure and obtain a curve which generally corresponds to the curve which would be obtained by a normal wide field microscope. The low pass filtering of the axial intensity distribution to obtain the empirical envelope Env(z) may be performed by convolving with a Gaussian filter. Other filtering methods, such as for example Butterworth, may be also used.

Apart from the dependency on z the function F(z) may generally depend on further parameters.

The stack of microscopic images may be obtained also by various microscopical methods using spatially modulated illumination, in particular using linear structured illumination. Furthermore, the above method provides a reasonable approximation in case of a two-photon 4Pi-A microscopy.

The stack of microscopic images may be for example obtained by means of a Spatially Modulated Illumination microscopy. In this case the model function I(z) is of the form:

$$I(z) = A \times \mathrm{Env}(z)(1 - r + r \cos^2(k(z-z_0) + \phi)),$$

wherein:
A is a scaling factor;
$k = 2n\pi/\lambda_{exc}$ is the wave number, wherein n is the refractive index of the medium and $\lambda_{exc}$ is the wavelength of the excitation light;
$z_0$ is a displacement of the observed modulation pattern with respect to the origin;
$\phi$ is a phase offset, and
r is the modulation depth defined as $$r = \frac{I_{max} - I_{min}}{I_{max}}, I_{max}$$

being the intensity maxima of the outer envelope of the axial intensity distribution and $I_{min}$ being the intensity maxima of the inner envelope of the axial intensity distribution.

The method may further comprising further the step of determining the size of the object in the axial direction, by relating the modulation depth r to the object size in the axial direction with a theoretical calibration curve.

The relationship between object size and fringe contrast β or respectively modulation depth r has no analytic inverse, so in one embodiment object sizes are previously determined graphically from the measured contrast. This step can be been replaced by computing a numerical solution after each fit. A correction, respectively calibration for unequal beam intensities may be also implemented.

The model function may be fitted using a Lavenburg-Marquart solver, solving a weighted or non-weighted least squares problem.

In one example the model function is fitted using a Lavenburg-Marquart solver, solving a weighted or non-weighted least squares problem with variances estimated using a combination of Gaussian distributed camera readout noise and the expected Poisson photon statistics.

The method may further comprise a step of estimating the start parameters for the fit, wherein said start parameters are extracted from the axial intensity distribution by finding the locations of the central maximum, the next fringe on one side, and the local minimum between the two.

The start parameter estimation can be for example performed in the following manner:

4) Find the global maximum
5) Find the local maximum situated at approximately half the expected wavelength from the global maximum
6) Find the local minimum between these two maxima Given the location and magnitude of these points, starting values for the actual wavelength, the modulation depth, and the phase of the modulation ($\lambda$, r and $z_0$) may be calculated respectively.

The method may also comprise a step of interpolating the data points prior to step of estimating the start parameters. To increase the accuracy of the estimates (particularly that of standing wave period), the data may be interpolated using for example lowpass interpolation prior to estimation. Surprisingly by interpolating the data points before start parameter estimation the accuracy and hence the convergence rate of the fit can be substantially improved (for example from ≈95% convergence to ≈98% convergence).

The method may further comprise a step of controlling the quality of the fit, wherein said step of controlling the quality of the fit comprises comparing the fitted wavelength to the wavelength of the excitation light.

Although it is possible to fit most signals, there may be cases when the fit does not converge to a sensible solution. There are three main reasons for this; insufficient signal-to-noise ratio, a false-positive object identification, or an object size significantly larger than 200 nm. In such cases, a post-processing step may be performed to reject the nonsensical solutions.

Traditional goodness of fit measures such as Chi-squared may be used to this extend. In some cases, however, they may not be sufficient to discriminate between good and bad fits to the SMI profiles. A robust estimate of quality of fit can, on the other hand, be obtained by comparing the fitted wavelength to the laser wavelength (in medium).

In one example, the step of controlling the quality of the fit comprises imposing a set of conditions on the fitted wavelength, a Chi-squared $\chi^2$ evaluation of the goodness of fit and a control of the fitted modulation depth, which should be in the range between 0 and 1 may be used.

The quality of the fit of the mathematical fitting function may be used as a measure of object analysis goodness. The adjusting the threshold level a-posteriori may be in this case performed by discarding all those points detected at and below a threshold value, at which a predetermined proportion of objects were not correctly fitted.

The object to be analysed may be detected in the image using the method for processing of microscopic images to detect objects of interest according to an aspect of the invention.

According to an aspect of the invention there is provided a computer implemented method for determining the size of sub-resolution objects in a three-dimensional stack comprising a plurality of two dimensional microscopic images of a fluorescently marked sample obtained by illuminating the sample with a structured illumination light and detecting the fluorescent light emitted from the sample, wherein each of said two dimensional microscopic images is an image of a plane, which is perpendicular to a predetermined axial direction, each of said two dimensional microscopic images being an image of a different plane along the axial direction said method comprising the steps:

detecting at least one object of interest in a three-dimensional stack of two dimensional microscopic images, comprising:
  subjecting each microscopic image to a bandpass filtering to obtain a filtered image, wherein the bandpass filtering is such as to suppress the noise and any objects which are larger than a predetermined size;
  processing the filtered image at a plurality of progressively decreasing threshold levels, said processing comprising at each threshold level detecting the objects of interest using an object labelling algorithm; and removing the detected objects detected at a given threshold level from the working image before proceeding to the next threshold level;
determining the axial intensity distribution of the fluorescent light along the axial direction;
fitting a mathematical model function I(z) of the form:

$$I(z) = A \times \mathrm{Env}(z) \times F(z)$$

to the obtained axial intensity distribution, wherein:
z is the predetermined axial direction;
A is a scaling factor;
Env(z) is an empirical envelope of the intensity distribution obtained by subjecting the intensity distribution to a low pass filtering, such as to remove the additional frequencies introduced through the structured illumination pattern; and
F(z) is a function fitted to the component of the intensity distribution in the axial direction due to the structured illumination light;
determining the size of the object in the axial direction by relating the modulation depth r to the object size in the axial direction with a theoretical calibration curve, wherein said modulation depth is defined as $$r = \frac{I_{max} - I_{min}}{I_{max}}, I_{max}$$

being the intensity maxima of the outer envelope of the axial intensity distribution and $I_{min}$ being the intensity maxima of the inner envelope of the axial intensity distribution.

According to another aspect of the invention there is provided a computing system comprising:
  a storage unit capable of storing a plurality of microscopic images;
  a processing unit capable of carrying out the steps of the method for processing of microscopic images according to an aspect of the invention to process the stored microscopic images.

The storage unit may be in particular capable of storing a three dimensional stack of two-dimensional images obtained for example by a SIM, CLSM, 4Pi or other microscopical method as explained above.

The processing unit may in particular comprise:
  a filtering unit to perform filtering of the microscopic image with a bandpass filter to obtain a filtered image, wherein the bandpass filtering is such as to suppress the noise and any objects which are larger than a predetermined size;

object detecting unit implementing the method to detect objects of interest by processing the filtered image at a plurality of progressively decreasing threshold levels, said processing comprising at each threshold level detecting the objects of interest using an object labelling algorithm; and removing the detected objects detected at a given threshold level from the working image before proceeding to the next threshold level (as explained in greater detail above).

The processing unit may comprise further a threshold determination unit for determining the threshold range over which the processing of the filtered image is applied (as explained in detail above). The threshold determination unit may comprise further a threshold post-processing unit for implementing the method of a posteriory threshold determination (as explained in greater detail above).

Alternatively or in addition to the above, the processing unit may comprise a data fitting unit for carrying out the fitting method (explained in detail above), and optionally a start parameter setting unit to set the start parameter for the fit according to a method as explained in detail above, and/or a quality control unit to implement the method of control of the quality of the fit as explained in greater detail above.

According to another aspect of the invention there is provided a computer program product comprising an instruction set for performing the steps of the method for processing of microscopic images according to an aspect of the invention when suitably loaded on a computer.

According to still another aspect of the invention there is provided a microscopical system comprising:
  an illumination system capable of providing an illumination light from a light source to at least partially illuminate a sample to be examined, the illumination system comprising at least one light source and a lens system;
  a detection system comprising at least one light detector capable of detecting a microscopic image of the illuminated sample;
  a sample holder;
  a computing unit comprising:
    a storage unit capable of storing the detected microscopic images;
    a processing unit capable of carrying out the steps of the method for processing of microscopic images according to an aspect of the present invention to process the stored microscopic images.

The illumination system may be an illumination system capable of providing a structured illumination light to at least partially illuminate the fluorescently marked sample. The detection system may be a detection system is capable of detecting a stack comprising a plurality of two dimensional microscopic images of the sample, said microscopic images being obtained by illuminating the sample with the structured illumination light and detecting the fluorescent light emitted from the sample, wherein each of said two dimensional microscopic images is an image of a plane, which is perpendicular to a predetermined axial direction, and each of said two dimensional microscopic images is an image of a different plane along the axial direction.

The microscopical system may be in particular a Spatially Modulated Light microscopical system, wherein
  the lens system comprises two oppositely arranged objective lenses;
  the structured illuminated light is generated by two coherent counter propagating laser beams focused in the back focal planes of the two opposite objective lenses, thus establishing a standing wave field in the space between the two objective lenses; and
  the sample holder is capable of positioning the sample between the two objective lenses and moving the sample along a direction parallel to the predetermined axial direction, said predetermined axial direction being parallel to the optical axis of the two objective lenses.

The Spatially Modulated Light microscopical system may have a vertical arrangement, wherein the optical axis of the oppositely arranged objective lenses is parallel to a vertical direction. The objective lenses have a common optical axis which is vertical or upright, i.e. in the direction of the force of gravity. The vertical arrangement allows a horizontal fixation of the sample plane (similar to the conventional sample holders), which facilitates the sample analysis. The vertical SMI microscopic system exhibits a stable optical configuration, which can operate consistently at different temperatures and which allow reliable size evaluation procedures. Both oil and water immersion objective lenses may be used in this microscopic system. This allows taking into account different optical conditions given by the specimens to be observed.

The microscopic system may further comprise an incubation camber enclosing the sample holder, the illumination and the detection system with the exception of the light source and the light detector, said incubation chamber being capable of maintaining a stable temperature. The incubator chamber may be capable of maintaining an autarkic atmosphere, which facilitates the in-vivo observations and measurements.

The microscopic system may further comprise an observation chamber for holding a living sample, said observation chamber comprising an interface to a flow control system, which enables a supply of nutritients and $CO_2$ to the sample and removal of waste products from the sample.

In one embodiment the speed of data acquisition is increased in order to minimise influences resulting for example from dynamic processes (such as Brown's movements in living specimens), while still being able to extract useful signals, for example useful signals for size determination. Thus, errors in the detection signal resulting for example from cellular or object movements may be minimized. For example the time for acquiring a complete 3D SMI data stack may be reduced down to 1.8 s. The higher speed of data acquisition allows in-vivo measurements to be performed.

In one further aspect of the present invention there is provided a SMI microscope with upright (vertical) configuration, hereafter called short vertical SMI microscope.

This microscope is applicable to a wide range of biological questions; and in particular to live cell imaging SMI.

The methods for processing and analysing microscopic images and the microscopic systems according to an aspect of the invention can be employed for study of the cell-nucleus to provide information about the genome structure and can be for example integrated within a system of Virtual Cell Nucleus Imaging (VIRNI). The methods for analysing microscopic images and the respective microscopic systems according to the above aspects of the invention can be combined with the SPDM (spectral precision distance microscopy) methods. This may allow a further reduction of the data acquisition time.

The methods for processing and analysing microscopic images and the microscopic systems according to an aspect of the invention may be employed for example for live cell measurements of the tet-operator region in U2OS cells, thus providing in-vivo signatures of subnuclear complexes. Other applications may be for example a chromosome analysis, study of the transcription processes in the DNA, ion channels, membranes, blood-brain barrier, pharmacological research, in particular for development of drugs, diagnostic tests, active agent screening, etc.

In another embodiment the methods for analysing microscopic images and the microscopic systems according to the above aspects of the invention can be employed in connection with high-throughput methods such as the evaluation and analysis of biomolecular array. Furthermore, so called oriented arrays may be employed, which may be loaded with biological or non-biological nano-structures. The biomolecular arrays or the oriented arrays may be produced using the so called Nanolith-method.

Still in another embodiment the methods for analysing microscopic images and the microscopic systems according to the above aspects of the invention can be employed in the material research and testing, for example for time- and cost-effective, non-destructive control of processes in nanometer range.

The resolution may be increased to detect objects of 20 nm and even smaller, for example down to 5 nm (i.e. about 1/100 of the employed wavelength). The resolution is considerably higher than the conventional optical resolution given by the Abbe limit, which is about 200 nm.

The invention claimed is:

1. A computer implemented method for processing of microscopic images to detect objects of interest comprising:
   subjecting the microscopic image to a bandpass filtering to obtain a filtered image, wherein the bandpass filtering is such as to suppress the noise and any objects which are larger than a predetermined size; and
   processing the filtered image at a plurality of progressively decreasing threshold levels, said processing comprising:
   at each threshold level detecting the objects of interest using an object labelling algorithm; and
   removing the objects detected at a given threshold level from the working image before proceeding to the next threshold level, wherein
   the upper threshold level of the threshold range over which the processing of the filtered image is applied is set at a half the maximum intensity in the filtered image; and
   the lower threshold level of the threshold range over which the processing of the filtered image is applied is estimated by multiplying the intensity corresponding to the maximum of the intensity histogram of the filtered image with a user defined factor.

2. The method of claim 1, wherein the removing the objects detected at each threshold level comprises:
   obtaining an estimate of the form the detected images would have taken in the image by applying a weighting to the masked image and convolving it with an approximation of the point spread function of the microscope;
   subtracting the estimate from the working image.

3. The method of claim 1, wherein the threshold levels are distributed logarithmically between the upper and lower threshold level.

4. The method of claim 1, further comprising:
   recording the threshold level at which the object is detected along with the position of the detected object; and
   adjusting the threshold level a-posteriori by discarding all those points detected at and below a threshold value, at which a predetermined proportion of objects are not being analysed with a predetermined measure of goodness.

5. A computer program product stored on a non-transitory medium and comprising an instruction set for performing the steps of the method for processing of microscopic images of claim 1 when suitably loaded on a computer.

6. A computer implemented method for processing a stack comprising a plurality of two dimensional microscopic images of a fluorescently marked sample obtained by illuminating the sample with a structured illumination light and detecting the fluorescent light emitted from the sample, wherein each of said two dimensional microscopic images is an image of a plane, which is perpendicular to a predetermined axial direction, each of said two dimensional microscopic images being an image of a different plane along the axial direction, said method comprising:
   for a given object in the stack of microscopic images, determining the axial intensity distribution of the fluorescent light along the axial direction; and
   fitting a mathematical model function I(z) of the form:

$$I(z)=A\times Env(z)\times F(z)$$

to the obtained axial intensity distribution, wherein:
   z is the predetermined axial direction;
   A is a scaling factor;
   Env(z) is an empirical envelope of the intensity distribution obtained by subjecting the intensity distribution to a low pass filtering, such as to remove the additional frequencies introduced through the structured illumination pattern; and
   F(z) is a function fitted to the component of the intensity distribution in the axial direction due to the structured illumination light.

7. The method of claim 6, wherein the stack of microscopic images is obtained by means of a Spatially Modulated Illumination microscopy, and wherein the model function I(z) is of the form:

$$I(z)=A\times Env(z)(1-r+r\cos^2(k(z-z_0)+\phi),$$

wherein:
   A is a scaling factor;
   $k=2n\pi/\lambda_{exc}$ is the wave number, wherein n is the refractive index of the medium and $\lambda_{exc}$ is the wavelength of the excitation light;
   $z_0$ is a displacement of the observed modulation pattern with respect to the origin;
   $\phi$ is a phase offset, and
   r is the modulation depth defined as $$r = \frac{I_{max} - I_{min}}{I_{max}}, I_{max}$$

being the intensity maxima of the outer envelope of the axial intensity distribution and $I_{min}$ being the intensity maxima of the inner envelope of the axial intensity distribution.

8. The method of claim 7, comprising further the step of determining the size of the object in the axial direction, by relating the modulation depth r to the object size in the axial direction with a theoretical calibration curve.

9. The method of claim 6, wherein the model function is fitted using a Lavenburg-Marquart solver, solving a weighted or non-weighted least squares problem.

10. The method of claim 6 further comprising a step of estimating the start parameters for the fit, wherein said start parameters are extracted from the axial intensity distribution by finding the locations of the central maximum, the next fringe on one side, and the local minimum between the two.

11. The method of claim 10 further comprising a step of interpolating the data points prior to step of estimating the start parameters.

12. The method of claim 6 further comprising a step of controlling the quality of the fit, wherein said step of controlling the quality of the fit comprises comparing the fitted wavelength to the wavelength of the excitation light.

13. The method of claim 6, wherein the object is detected using the method for processing of microscopic images to detect objects of interest comprising:
- subjecting the microscopic image to a bandpass filtering to obtain a filtered image, wherein the bandpass filtering is such as to suppress the noise and any objects which are larger than a predetermined size; and
- processing the filtered image at a plurality of progressively decreasing threshold levels, said processing comprising:
- at each threshold level detecting the objects of interest using an object labelling algorithm; and
- removing the objects detected at a given threshold level from the working image before proceeding to the next threshold level.

14. The method of claim 13, further comprising:
- recording the threshold level at which the object is detected along with the position of the detected object; and
- adjusting the threshold level a-posteriori by discarding all those points detected at and below a threshold value, at which a predetermined proportion of objects are not being analysed with a predetermined measure of goodness, wherein the quality of the fit of the mathematical fitting function is used as a measure of object detection goodness; and wherein the adjusting the threshold level a-posteriori is performed by discarding all those points detected at and below a threshold value, at which a predetermined proportion of objects were not correctly fitted.

15. A computing system comprising:
- a storage unit capable of storing a plurality of microscopic images;
- a processing unit capable of processing the stored microscopic images, said processing unit comprising:
- a bandpass filter for subjecting the microscopic images to a bandpass filtering to obtain filtered images that suppress noise and any objects larger than a predetermined size; and
- means for processing the filtered image at a plurality of progressively decreasing threshold levels, said means for processing comprising:
- a detector using an object labelling algorithm at each threshold level for detecting objects of interest; and
- means for removing objects detected at a given threshold level from a working image before proceeding to a next threshold level, wherein
- an upper threshold level of the threshold range over which the filtered image is processed is set at half of a maximum intensity in the filtered image; and
- a lower threshold level of the threshold range over which the filtered image is processed is estimated by multiplying an intensity corresponding to a maximum of an intensity histogram of the filtered image with a user defined factor.

16. A microscopical system comprising:
- an illumination system capable of providing an illumination light from a light source to at least partially illuminate a sample to be examined, the illumination system comprising at least one light source and a lens system;
- a detection system comprising a light detector capable of detecting microscopic images of the illuminated sample;
- a sample holder; and
- a the computing system of claim 15.

17. The system of claim 16, wherein
- the illumination system is capable of providing a structured illumination light to at least partially illuminate the fluorescently marked sample;
- the detection system is capable of detecting a stack comprising a plurality of two dimensional microscopic images of the sample, said microscopic images being obtained by illuminating the sample with the structured illumination light and detecting the fluorescent light emitted from the sample, wherein each of said two dimensional microscopic images is an image of a plane, which is perpendicular to a predetermined axial direction, and each of said two dimensional microscopic images is an image of a different plane along the axial direction.

18. The system of claim 17, wherein the microscopical system is a Spatially Modulated Light microscopical system, wherein
- the lens system comprises two oppositely arranged objective lenses;
- the structured illuminated light is generated by two coherent counter propagating laser beams focused in the back focal planes of the two opposite objective lenses, thus establishing a standing wave field in the space between the two objective lenses; and
- the sample holder is capable of positioning the sample between the two objective lenses and moving the sample along a direction parallel to the predetermined axial direction, said predetermined axial direction being parallel to the optical axis of the two objective lenses.

19. The system of claim 18, wherein the Spatially Modulated Light microscopical system has a vertical arrangement, wherein the optical axis of the oppositely arranged objective lenses is parallel to a vertical direction.

20. The system of claim 16 comprising further an incubation chamber enclosing the sample holder, the illumination and the detection system with the exception of the light source and the light detector, said incubation chamber being capable of maintaining a stable temperature.

21. The system of claim 16 comprising further an observation chamber for holding a living sample, said observation chamber comprising an interface to a flow control system, which enables a supply of nutritients and $CO_2$ to the sample and removal of waste products from the sample.

* * * * *